(12) United States Patent
Kim

(10) Patent No.: US 10,634,402 B2
(45) Date of Patent: Apr. 28, 2020

(54) HEAT PUMP SYSTEM FOR VEHICLE WITH BATTERY AND ELECTRONIC COMPONENT COOLING

(71) Applicants: Hyundai Motor Company, Seoul (KR); Kia Motors Corporation, Seoul (KR)

(72) Inventor: Jae Yeon Kim, Whasung-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 109 days.

(21) Appl. No.: 15/971,186

(22) Filed: May 4, 2018

(65) Prior Publication Data

US 2019/0145675 A1  May 16, 2019

(30) Foreign Application Priority Data

Nov. 10, 2017  (KR) ........................ 10-2017-0149426

(51) Int. Cl.
*B60H 1/00* (2006.01)
*F25B 30/02* (2006.01)
*B60H 1/32* (2006.01)
(Continued)

(52) U.S. Cl.
CPC ......... *F25B 30/02* (2013.01); *B60H 1/00278* (2013.01); *B60H 1/00342* (2013.01);
(Continued)

(58) Field of Classification Search
CPC ............ B60H 1/00278; B60H 1/00899; B60H 1/143; B60H 1/2221; B60H 1/00385;
(Continued)

(56) References Cited

U.S. PATENT DOCUMENTS 6,047,770 A * 4/2000 Suzuki ............... B60H 1/00007
165/202
6,170,270 B1  1/2001 Arshansky et al.
(Continued)

FOREIGN PATENT DOCUMENTS

CN  103380339 A  10/2013

*Primary Examiner* — Cassey D Bauer
*Assistant Examiner* — Lionel Nouketcha
(74) *Attorney, Agent, or Firm* — Morgan, Lewis & Bockius LLP

(57) ABSTRACT

A heat pump system for vehicle including a cooling apparatus, the cooling apparatus comprising a radiator and a first water pump connected to a coolant line, a battery module provided in a battery coolant line selectively connectable to the coolant line through a first valve, an air conditioner connected to the battery coolant line through a third valve, a second water pump and a cooler provided at the first connection line, a heating device connected to the battery coolant line through a fourth valve, a third water pump and a heater provided at the second connection line, and a centralized energy (CE) module connected to the coolant line and the first and second connection lines to supply coolant of low temperature to the air conditioner, to supply coolant of high temperature to the heating device, and to selectively heat-exchanging thermal energy generated upon condensing and evaporation of a refrigerant circulating inside the CE module with the coolant.

20 Claims, 8 Drawing Sheets

(51) Int. Cl.
*F25D 17/02* (2006.01)
*F28D 9/00* (2006.01)

(52) U.S. Cl.
CPC ..... *B60H 1/00385* (2013.01); *B60H 1/00885* (2013.01); *B60H 1/00921* (2013.01); *B60H 1/32284* (2019.05); *B60H 1/004* (2013.01); *B60H 1/00428* (2013.01); *B60H 1/00899* (2013.01); *B60H 2001/00307* (2013.01); *B60H 2001/00928* (2013.01); *B60H 2001/00949* (2013.01); *F25D 17/02* (2013.01); *F28D 9/0093* (2013.01)

(58) Field of Classification Search
CPC ............... B60H 1/00392; B60H 1/004; B60H 2001/00307; B60H 2001/00928; B60H 1/00921; B60H 1/32284; B60H 1/00428; B60H 1/00885; F25B 25/005; B60L 11/187; B60L 11/1874; B60L 11/1875; B60L 2240/545
See application file for complete search history.

(56) References Cited

U.S. PATENT DOCUMENTS

| | | | |
|---|---|---|---|
| 8,402,776 B2 * | 3/2013 | Johnston | B60L 3/0046 62/79 |
| 8,899,062 B2 | 12/2014 | Kadle et al. | |
| 9,109,840 B2 | 8/2015 | Kadle et al. | |
| 9,239,193 B2 | 1/2016 | Kadle et al. | |
| 9,701,215 B1 * | 7/2017 | Kim | B60L 11/1874 |
| 2005/0022983 A1 | 2/2005 | Kadle et al. | |
| 2012/0297809 A1 * | 11/2012 | Carpenter | B60L 1/003 62/244 |
| 2013/0283838 A1 | 10/2013 | Kadle et al. | |
| 2016/0129756 A1 * | 5/2016 | Enomoto | F25B 25/005 165/202 |
| 2016/0339767 A1 * | 11/2016 | Enomoto | F25B 25/005 |
| 2017/0197490 A1 * | 7/2017 | Enomoto | F25B 1/00 |
| 2017/0253105 A1 * | 9/2017 | Allgaeuer | B60H 1/00278 |

\* cited by examiner

HEAT PUMP SYSTEM FOR VEHICLE WITH BATTERY AND ELECTRONIC COMPONENT COOLING

CROSS-REFERENCE TO RELATED APPLICATION

The present application claims priority to Korean Patent Application No. 10-2017-0149426 filed on Nov. 10, 2017, the entire contents of which is incorporated herein for all purposes by this reference.

BACKGROUND OF THE INVENTION

Field of the Invention

The present invention relates to a heat pump system for a vehicle. More particularly, the present invention relates to a heat pump system for a vehicle for cooling or heating an internal to the vehicle selectively using a coolant of a high temperature or a coolant of a low temperature.

Description of Related Art

In general, an air conditioner for a vehicle includes an air conditioner system for circulating coolant in order to heat or cool an internal to the vehicle.

The air conditioner system may maintain a pleasant indoor environment by maintaining an internal temperature of a vehicle at a proper temperature regardless of change in an external temperature, and is configured to heat or cool an internal to the vehicle by heat exchange by an evaporator during a procedure where coolant discharge through drive of a compressor again circulates to the compressor through a condenser, a receiver dryer, an expansion valve, and an evaporator.

That is, air conditioner system condenses gaseous coolant of high temperature and high pressure compressed from a compressor in a cool mode of summer to reduce a temperature and humidity of an inside through evaporation in an evaporator through a receiver dryer and an expansion valve.

Meanwhile, in recent years, as there is growing interest in energy efficiency and environmental pollution problem, there is a need to develop an environmentally-friendly vehicle configured for substantially replacing for an internal combustion engine vehicle. The environmentally-friendly vehicle is divided into an electric vehicle driven by use of a fuel cell or electricity as a power source and a hybrid vehicle driven using an engine and a battery.

Among environmentally-friendly vehicles, an electric vehicle or a hybrid vehicle does not use a separate heater unlike an air conditioner of a general vehicle. An air conditioner applied to the environmentally-friendly vehicle refers to a heat pump system.

Meanwhile, a case of an electric vehicle converts chemical reaction energy of oxygen and hydrogen into electrical energy to generate a driving torque. During the above procedure, thermal energy is generated by a chemical reaction inside a fuel cell. To ensure the performance of a fuel cell is essential in order to efficiently remove the generated heat.

Furthermore, in the hybrid vehicle, together with an engine operated by a general fuel, a motor is driven using the above fuel cell or electricity from an electric battery to generate a driving torque. Accordingly, by efficiently removing heat generated from the fuel cell or the battery and the motor, the performance of the motor may be ensured.

Accordingly, a hybrid vehicle or an electric vehicle according to the related art may include a separate closed circuit as a battery cooling system together with a motor, an electrical equipment, a cooling meant to prevent a battery including a fuel cell from generating heat, and a heat pump system.

Therefore, the size and a weight of a cooling module disposed at a forward direction of a vehicle, and a layout of connection pipes for supplying a refrigerant and a coolant to a heat pump system, a cooler, and the battery cooling system inside an engine compartment is complicated.

Furthermore, to obtain an optimal performance of the battery, a battery cooling system for warming up or cooling the battery according to a state of the vehicle is separately provided. A plurality of valves for connecting connection pipes with each other is applied. Due to frequent opening or closing operation of the valves, noise and vibration are transferred to an internal to the vehicle so that ride comfort deteriorates.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a heat pump system for a vehicle having advantages of selectively heat-exchanging thermal energy generated from a coolant with a coolant upon condensing and evaporation of the coolant to control an internal temperature of the vehicle using the heat-exchanged coolant of a low temperature or a high temperature.

Various aspects of the present invention are directed to providing a heat pump system for a vehicle which improves the heating efficiency of the vehicle using a waste heat of electrical equipment and a battery module, and the whole travel distance of the vehicle by efficiently controlling a battery module to represent the optimal performance of the battery module.

A heat pump system for a vehicle according to an exemplary embodiment of the present invention, including: a cooling apparatus including a radiator and a first water pump which are connected to a coolant line, and to circulate a coolant through the coolant line; a battery module provided in a battery coolant line selectively connectable to the coolant line through a first valve; an air conditioner connected to the battery coolant line through a third valve, to configure a first connection line for cooling an internal to the vehicle by selectively forming an independent closed circuit, and including a second water pump and a cooler provided at the first connection line; a heating device connected to the battery coolant line through a fourth valve, to configure a second connection line for heating the internal to the vehicle by selectively forming the independent closed circuit, and including a third water pump and a heater provided at the second connection line; and a centralized energy (CE) module connected to the coolant line and the first and second connection lines to supply a coolant of a low temperature to the air conditioner, and to supply a coolant of a high temperature to the heating device, and to selectively heat-exchanging thermal energy generated upon condensing and evaporation of a refrigerant circulating inside with the coolant.

The cooling apparatus may cool electrical equipment or may cool the battery module by use of a coolant that circulates along the coolant line.

The CE module may include: a main heat exchanger provided in the coolant line between the radiator and the battery module, and evaporating or condensing a refrigerant; an expansion valve connected to the main heat exchanger through a refrigerant line; an evaporator which is connected to the expansion valve through the refrigerant line, and provided in the first connection line to cool a coolant that circulates along the first connection line in the air conditioner; and a compressor which is provided in the refrigerant line between the evaporator and the main heat exchanger.

An internal heat exchanger may be provided in the refrigerant line between the evaporator and the compressor.

The internal heat exchanger may be connected to the refrigerant line that connects the main heat exchanger and the expansion valve, and the refrigerant line that connects the evaporator and the compressor.

When the main heat exchanger condenses the refrigerant, the internal heat exchanger may additionally condense the refrigerant condensed in the main heat exchanger through heat-exchange with a low-temperature refrigerant discharged from the evaporator, and may introduce the additionally condensed refrigerant to the expansion valve.

The first valve may selectively connect the second coolant line and the battery coolant line between the radiator and the battery module, and the third and fourth valves may be provided in the battery coolant line while interposing the battery module therebetween and selectively connects the battery coolant line with the first and second connection lines.

The CE module may further include: a sub-condenser connected to the compressor through the refrigerant line between the main heat exchanger and the compressor, and provided at the second connection line so that the heating device heats the coolant circulating through the second connection line; and a sub-expansion valve provided at the refrigerant line between the sub-condenser and the main heat exchanger.

In the battery coolant line, a first branch line that connects the battery module with the air conditioner and the heating device through the first valve and closes connection with the cooling apparatus may be provided, in the coolant line, a second branch line that separates the battery coolant line and the coolant line may be provided, and a fourth branch line which is connected to the coolant line between the radiator and the first water pump through a fifth valve may be provided in the coolant line that connects electrical equipment.

When the battery module is cooled together with the electrical equipment in a cooling mode of the vehicle, the first branch line may be opened by operation of the first valve, the second branch line may be opened, and the connection between the coolant line and the battery coolant line may be closed by the opened first and second branch lines, the battery coolant line connected to the battery module may be connected to the first connection line by an operation of the third valve, the connection between the battery coolant line and the second connection line may be closed by an operation of the fourth valve, the third branch line may be closed by an operation of the fifth valve, and the refrigerant may be circulated, the main heat exchanger may condense the refrigerant, and the sub-condenser and the sub-expansion valve may stop operation in the CE module.

The evaporator may heat-exchange a coolant circulating through the first connection line from the battery coolant line by an operation of the third valve with an internally evaporated refrigerant of a low temperature to cool the coolant, a low-temperature coolant passed through the evaporator may be supplied to the cooler along the first connection line by an operation of the second water pump, and the low-temperature coolant passed through the cooler may be supplied to the battery module along the battery coolant line which is connected to the first connection line by operation of the third valve to cool the battery module.

In the cooling apparatus, the opened second branch line may be connected to the coolant line such that an independent closed circuit is formed, and a coolant cooled in the radiator may cool the electrical equipment while circulating by operation of the first water pump.

When increasing a temperature of the battery module in a cooling mode of the vehicle, the first branch line may be opened by an operation of the first valve, the second branch line may be opened, and the connection between the coolant line and the battery coolant line may be closed by the opened first and second branch lines, the battery coolant line connected to the battery module and the first connection line may form an independent closed circuit by an operation of the third valve, the battery coolant line may be connected to the second connection line by an operation of the fourth valve, the third branch may be closed by and operation of the fifth valve, and the refrigerant may be circulated, the main heat exchanger and the sub-condenser may condense the refrigerant, and the sub-expansion valve may stop operation in the CE module.

The sub-condenser may heat-exchange a coolant circulating the second connection line from the battery coolant line by an operation of the fourth valve with a high-temperature refrigerant supplied from the compressor to heat the coolant, the coolant of the high temperature from the sub-condenser may be supplied to the heater through the second connection line by an operation of the third water pump, and the coolant of the high temperature from the heater may be supplied to the battery module through the battery coolant line connected by an operation of the fourth valve to increase a temperature of the battery module.

When recovering a waste heat of the battery module and the electrical equipment in a heating mode of the vehicle, the first branch line may be closed by an operation of the first valve, the second branch line may be closed, and the coolant line may be connected to the battery coolant line through the closed first and second branch lines, the connection between the battery coolant line and the first connection line may be closed by an operation of the third valve, the battery coolant line and the second connection line may respectively form an independent closed circuit by an operation of the fourth valve, in a state that the third branch line is opened by an operation of the fifth valve, the coolant line for connecting the electrical equipment with the radiator may be closed, the coolant may be circulated along a second connection line by an operation of the third water pump in the heating device, and the refrigerant may circulate, the expansion valve and the evaporator may stop operation, and the sub-expansion valve may operate to expand the refrigerant having passed through the sub-condenser and may supply the expanded refrigerant to the main heat exchanger in the CE module.

A waste heat generated from the electrical equipment and the battery module may increase a temperature of the coolant circulating through the coolant line and the battery coolant line, the coolant of which a temperature is increased, may be recovered while increasing a temperature of the refrigerant from the main heat exchanger, and the coolant that circulates along the second connection line may be more heated through heat-exchange with a high-temperature refrigerant supplied from the compressor in the sub-condenser and then may be supplied to the heater in the heating device.

When increasing a temperature of the battery module in a heating mode of the vehicle, the first branch line may be opened by operation of the first valve, the second branch line may be opened, and the connection between the coolant line and the battery coolant line may be closed by the opened first and second branch lines, the connection between the battery coolant line connected to the battery module and the first connection line may be closed by an operation of the third valve, the battery coolant line may be connected to the second connection line by an operation of the fourth valve, in a state that the third branch line may be opened by an operation of the fifth valve, the coolant line for connecting the electrical equipment with the radiator may be closed, and the refrigerant may circulate, the expansion valve and the evaporator may stop operation, and the sub-expansion valve may operate to expand the refrigerant having passed through the sub-condenser and may supply the expanded refrigerant to the main heat exchanger in the CE module.

When cooling the battery module in a heating mode of the vehicle, the first branch line may be opened by an operation of the first valve, the second branch line may be opened, and the connection between the coolant line and the battery coolant line may be closed by the opened first and second branch lines, the battery coolant line connected to the battery module may be connected to the first connection line by an operation of the third valve, the battery coolant line and the second connection line may respectively form an independent closed circuit by an operation of the fourth valve, the third branch line may be closed by an operation of the fifth valve, and the refrigerant may be circulated, the main heat exchanger and the sub-condenser may condense the refrigerant, and the sub-expansion valve may stop operation in the CE module.

In a dehumidification mode of the vehicle, the first branch line may be closed by an operation of the first valve, the second branch line may be closed, and the coolant line may be connected to the battery coolant line through the closed first and second branch lines, the battery coolant line and the first connection line may respectively form an independent closed circuit by an operation of the third valve, the battery coolant line and the second connection line may respectively form an independent closed circuit by an operation of the fourth valve, the third branch line may be closed by an operation of the fifth valve, the coolant may circulate through first and second connection lines by operations of the second and third water pumps in the air conditioner and the heating device, respectively, and the refrigerant is circulated in the CE module.

When an external temperature is low in a dehumidification mode, the third branch line closed may be open by an operation of the fifth valve, and the coolant line for connecting the electric product to the radiator may be closed.

When the temperature of the battery module is raised by use of a waste heat of the electrical equipment while the cooling or heating mode of the vehicle is not operated, the circulation of the refrigerant may be stopped in the CE module, the first branch line may be closed by an operation of the first valve, the second branch line may be closed, and the coolant line may be connected to the battery coolant line through the closed first and second branch lines, the connection between the battery coolant line and the first and second connection lines may be closed by an operation of the third and fourth valves, and in a state that the third branch line is opened by an operation of the fifth valve, the coolant line for connecting the electrical equipment with the radiator may be closed.

A reservoir tank which is connected to the third branch line may be provided between the radiator and the main heat exchanger.

The first and fifth valves may be three-way valve, and the third and fourth valves may be four-way valve.

The main heat exchanger, the sub-condenser, and the evaporator may be a water cooling heat exchanger into which a coolant is introduced.

A refrigerant that circulates in the CE module may be an R152-a, R744, or R290 refrigerant.

The electrical equipment may include a motor, an electric power control unit (EPCU), or an on board charger (OBC), the motor and the EPCU generate heat while traveling, and the OBC may generate heat when charging the battery module.

As described above, in the heat pump system for a vehicle according to an exemplary embodiment of the present invention, a system may be simplified and a layout of connection pipes in which a coolant circulates may be simplified by selectively heat-exchanging thermal energy generated from a refrigerant with a coolant upon condensation and evaporation of the refrigerant to control an internal temperature of the vehicle using the heat-exchanged coolant of a low temperature or a high temperature.

Furthermore, the present invention may improve heating efficiency of the vehicle using waste heat of electrical equipment and a battery module, and may increase the whole travel distance of the vehicle through efficient temperature control of a battery module to obtain optimal performance of the battery module.

Moreover, the present invention may reduce a size and a weight by packaging a Centralized Energy Module (CE module) for generating thermal energy through condensation and evaporation of a coolant.

Furthermore, the present invention may prevent noise, vibration, and operational instability from being generated as compared with an air conditioner according to the related art by use of a high performance R152-a, R744, or R290 refrigerant in a CE module.

Furthermore, the present invention may increase sub-cooling of a refrigerant to improve cooling performance and efficiency by configuring a sub-condenser and an internal heat exchanger together to increase a condensation amount of the refrigerant in the CE module.

Furthermore, the present invention may reduce a manufacturing cost and a weight, and may improve space utilization by simplifying the entire system.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
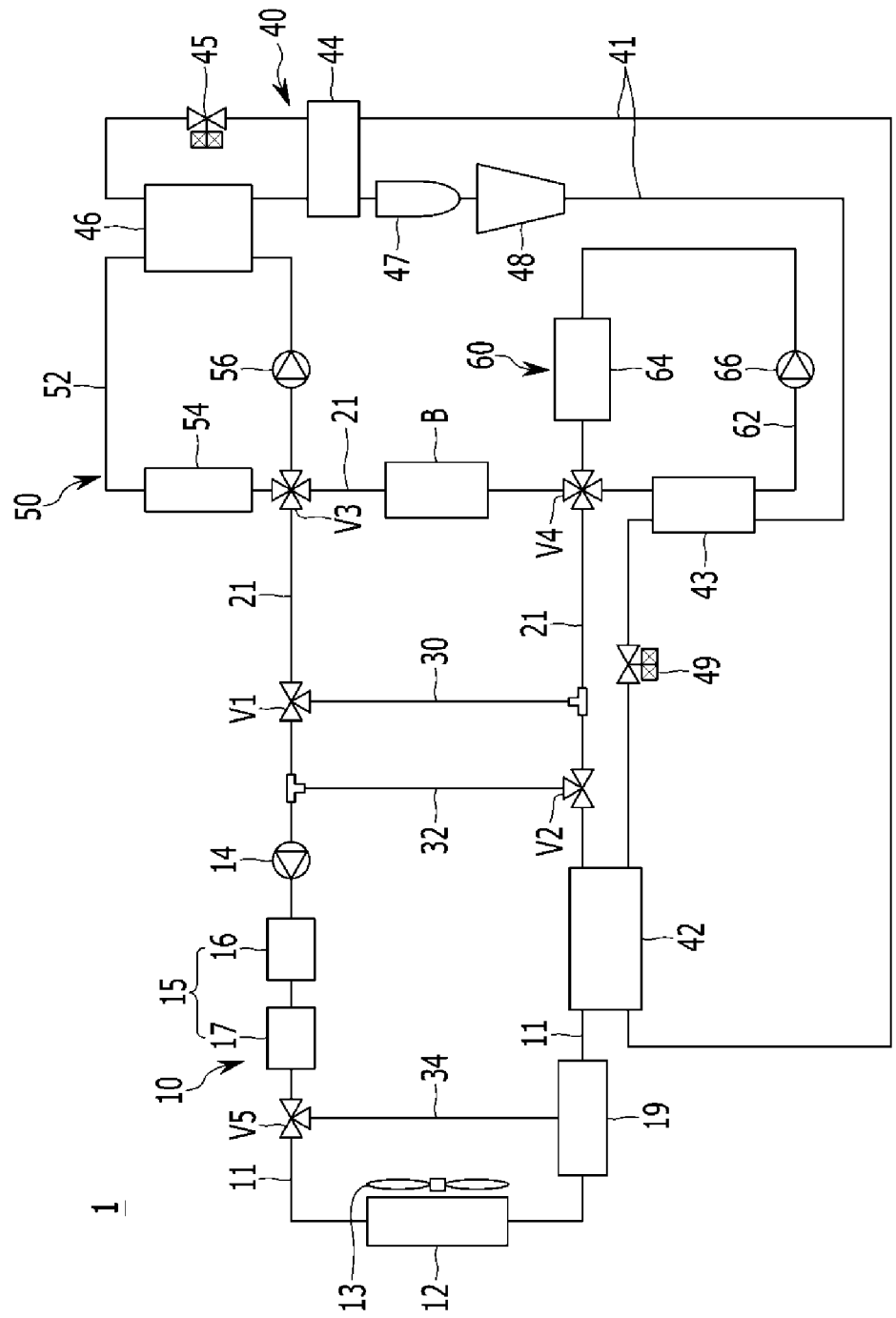
FIG. 1 is a block diagram of a heat pump system for a vehicle according to an exemplary embodiment of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the contrary, the invention(s) is/are intended to cover not only the exemplary embodiments of the present invention, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Although embodiments have been described with reference to a number of illustrative embodiments thereof, it should be understood that numerous other modifications and embodiments may be devised by those skilled in the art that will fall within the spirit and scope of the principles of the present invention.

The drawings and description are to be regarded as illustrative in nature and not restrictive. Like reference numerals designate like elements throughout the specification.

Since the size and the thickness of each configuration shown in drawings are arbitrarily indicated for better understanding and ease of description, the present invention is not limited to shown drawings, and the thickness of layers, films, panels, regions, etc., are exaggerated for clarity.

In addition, unless explicitly described to the contrary, the word "comprise" and variations such as "comprises" or "comprising" will be understood to imply the inclusion of stated elements but not the exclusion of any other elements.

Furthermore, terms such as " . . . unit", " . . . means", " . . . unit", and " . . . member" described in the specification mean a unit of a collective configuration to perform at least one function or operation.

FIG. 1 is a block diagram of a heat pump system for a vehicle according to an exemplary embodiment of the present invention.

A heat pump system 1 for a vehicle according to an exemplary embodiment of the present invention selectively exchanges thermal energy generated from a refrigerant in condensation and evaporation with a coolant to perform a cooling mode or a heating mode of the vehicle by use of only a low-temperature or high-temperature coolant.

The heat pump system 1 is applicable to hybrid vehicles or electric vehicles.

Referring to FIG. 1, the heat pump system 1 may include a cooling apparatus 10, a battery module B, a centralized energy (CE) module 40, an air conditioner 50, and a heating device 60.

The cooling apparatus 10 may include a radiator 12 and a first water pump 14 that are connected through a coolant line 11, and circulates a coolant to the coolant line 11 to cool electrical equipment 15.

Here, the electrical equipment 15 may include an electric power control unit (EPCU) 16 that may include a motor, and an on board charger (OBC) 17.

The EPCU 16 may generate heat while driving, and the OBC 17 may generate heat when the battery module B is charged.

Accordingly, when waste heat of the electrical equipment 15 is recovered in the heating mode of the vehicle, heat generated from the EPCU 16 is recovered, and the heat generated from the OBC 17 may be recovered when the battery module B is charged.

The radiator 12 is disposed in a front of the vehicle, and a cooling fan 13 is disposed at a rear of the radiator 12 to cool the coolant by operation of the cooling fan 13 and through heat exchange with external air.

The cooling apparatus 10 circulates the coolant cooled in the radiator 12 along the coolant line 11 by operation of the first water pump 14 such that the electrical equipment 15 may be cooled before it may be overheated.

The battery module B is provided in a battery coolant line 21 which is selectively connectable to the coolant line 11 through first and second valves V1 and V2.

Here, the first valve V1 may selectively connect the coolant line 11 connected to the electrical equipment 15 and the battery coolant line 21 between the radiator 12 and the battery module B.

Such a battery module B supplies power to the electrical equipment 15, and is provided as a water cooling type so that the battery module B is cooled by a coolant that flows along the battery coolant line 21.

That is, the battery module B is selectively connectable to the cooling apparatus 10 through the battery coolant line 21 according to operation of the first and second valves V1 and V2, and may be cooled by the coolant that circulates along the battery coolant line 21.

In the exemplary embodiment of the present invention, the air conditioner 50 is selectively connectable to the battery coolant line 21 through the third valve V3. In such an air conditioner 50, a first connection line 52 is provided to cool the internal of the vehicle by forming a selectively independent closed circuit. Furthermore, the air conditioner 50 may include a cooler 54 and a second water pump 56 that are provided in the first connection line 52.

The air conditioner 50 may cool the cooler 54 by use of a low-temperature coolant that circulates along the first connection line 52 by the operation of the second water pump 56 and cooled by the CE module 40.

Here, the cooler 54 is provided in an HVAC module which is provided in the vehicle. Accordingly, air supplied to the internal of the vehicle from the HVAC module may be cooled through heat exchange with the low-temperature coolant while passing through the cooler 54.

In the exemplary embodiment of the present invention, the heating device 60 is selectively connectable to the battery coolant line 21 through a fourth valve V4. In such the heating device 60, a second connection line 62 is formed to heat the internal of the vehicle by forming a selectively independent closed circuit. Furthermore, the heating device 60 may include a heater 64 and a third water pump 66 provided in the second connection line 62.

The heating device 60 circulates along the second connection line 62 by operation of the third water pump 66, and may heat the heater 64 by use of a high-temperature coolant heated by the CE module 40.

Here, the heater 64 is provided in the HVAC module provided in the vehicle. Accordingly, air supplied to the internal of the vehicle from the HVAC module is heated through heat exchange with the high-temperature coolant while passing through the heater 64.

The cooler 54 and the heater 64 may be provided as water-cooled types that cool or heat according to the temperature of the coolant introduced thereinto.

Meanwhile, the third valve V3 and the fourth valve V4 are provided at the battery coolant line 21 while interposing the battery module B therebetween.

The third and fourth valves V3 and V4 may connect the battery coolant line 21 with the first and second connection lines 52 and 62, respectively.

Here, the third and fourth valves V3 and V4 may be a four-way valve. Furthermore, the first, second, and third water pumps 14, 56, and 66 may be an electric water pump.

The centralized energy (CE) module 40 is connected to the coolant line 11 and the first and second connection lines 52 and 62 to respectively supply a low-temperature coolant to the air conditioner 50 and a high-temperature coolant to the heating device 60.

The CE module 40 performs selective heat exchange between thermal energy generated from condensation and evaporation of a refrigerant that circulates in the CE module 40 with the coolant, and the heat-exchanged low-temperature or high-temperature coolant is supplied to the air conditioner 50 and the heating device 60.

Here, the refrigerant may be a high-performing R152-a, R744, or R290 refrigerant.

That is, the low-temperature coolant is supplied to the cooler 54 through the first connection line 52, and the high-temperature coolant is supplied to the heater 64 through the second connection line 62.

Here, the CE module 40 may include a main heat exchanger 42, an expansion valve 45, an evaporator 46, and a compressor 48.

First, the main heat exchanger 42 is provided in the coolant line 11 between the radiator 12 and the second valve V2. Such a main heat exchanger 42 may condense or evaporate the refrigerant.

Accordingly, the main heat exchanger 42 condenses or evaporates the refrigerant by performing heat exchange with the coolant, and thermal energy generated from the condensation or evaporation of the refrigerant is supplied to the coolant to increase or decrease the temperature of the coolant.

Here, the second valve V2 may selectively connect the coolant line 11 and the battery coolant line 21 between the main heat exchanger 42 and the battery module B.

The expansion valve 45 may be connected to the main heat exchanger 42 through a refrigerant line 41. Such an expansion valve 45 is expanded by receiving a refrigerant having passed through the main heat exchanger 42. The expansion valve 46 may be formed of either a mechanic or electronic type.

The evaporator 46 is connected to the expansion valve 45 through the refrigerant line 41, and may be provided in the first connection line 52 to cool the coolant that circulates along the first connection line 52 in the air conditioner 50.

Such an evaporator 46 evaporates the refrigerant introduced therein through heat exchange with the coolant, and low-temperature thermal energy generated from evaporation of the refrigerant is supplied to the coolant to reduce the temperature of the coolant.

Furthermore, the compressor 48 is provided in the refrigerant line 41 between the evaporator 46 and the main heat exchanger 42. The compressor 41 compresses a refrigerant discharged from the evaporator 46 in a gas state.

Here, an accumulator 47 and an internal heat exchanger 44 may be sequentially provided in the refrigerant line 41 between the evaporator 46 and the compressor 48.

The refrigerant line 41 that connects the main heat exchanger 42 and the expansion valve 45 and the refrigerant line 41 that connects the accumulator 47 and the compressor 48 may be respectively connected to the internal heat exchanger 44.

Furthermore, when the main heat exchanger 42 condenses the refrigerant, the internal heat exchanger 44 additionally condenses the refrigerant condensed by the main heat exchanger 42 through heat exchange with a low-temperature refrigerant discharged from the evaporator 46 and then the additionally condensed refrigerant is introduced to the expansion valve 45.

The accumulator 47 is provided in the refrigerant line 41 between the internal heat exchanger 44 and the compressor 48. The accumulator 47 supplies a refrigerant only in a gas state to the compressor 48 such that efficiency and durability of the compressor 48 may be improved.

Thus, the refrigerant discharged from the evaporator 46 may be supplied to the compressor 48 after exchanging heat with the refrigerant supplied from the main heat exchanger 42 while passing through the internal heat exchanger 44.

Here, the condensed refrigerant, discharged from the main heat exchanger 32, and the low-temperature refrigerant, discharged from the evaporator 46, are respectively introduced into the internal heat exchanger 44. Accordingly, the internal heat exchanger 44 additionally exchanges heat between the low-temperature refrigerant and the condensed refrigerant to further decrease a temperature of the refrigerant and increase the amount of condensation.

As described, since the internal heat exchanger 44 further condenses the refrigerant that has been condensed in the main heat exchanger 42, sub-cooling of the refrigerant may be increased, and accordingly, a coefficient of performance, which is a coefficient of cooling performance with respect to power consumption of the compressor, may be improved.

Meanwhile, the CE module 40 may further include a sub-condenser 43 and a sub-expansion valve 49.

First, the sub-condenser 43 is connected to the compressor 48 between the main heat exchanger 42 and the compressor 48 through the refrigerant line 41, and is provided in the second connection line 62 to heat the coolant that circulates along the second connection line 62 in the heating device 60.

Furthermore, the sub-expansion valve 49 may be provided in the refrigerant line 41 between the sub-condenser 43 and the main heat exchanger 42.

The sub-condenser 43 primarily condenses the refrigerant discharged from the compressor 48 when the main heat exchanger 42 condenses the refrigerant. Accordingly, the main heat exchanger 42 additionally condenses the refrigerant condensed in the sub-condenser 43, increasing the amount of condensation of the refrigerant.

Here, the sub-expansion valve 49 may pass the refrigerant to the main heat exchanger 42 without expending the refrigerant.

On the other hand, when the main heat exchanger 42 evaporates the refrigerant, the sub-expansion valve 49 may expand the refrigerant discharged from the sub-condenser 43 and then supply the expanded refrigerant to the main heat exchanger 42.

Meanwhile, in the exemplary embodiment of the present invention, the evaporated low-temperature refrigerant in the internal heat exchanger 44 and the condensed refrigerant exchange heat with each other, but this is not restrictive. Some of the refrigerant discharged from the internal heat exchanger 44 is bypassed and then cooled, and a remaining refrigerant introduced from the internal heat exchanger 44 may be cooled by simultaneously using the cooled refrigerant and the low-temperature refrigerant discharged from the evaporator 46 to increase sub-cooling of the refrigerant.

Such a main heat exchanger 42, sub-condenser 43, and evaporator 46 may be water-cooling types of heat exchangers into which a coolant is introduced.

When the expansion valve 45 is provided as an electronic valve, the refrigerant sequentially passes the sub-condenser 43, the main heat exchanger 42, and the internal heat exchanger 44 and is then introduced into the evaporator 46. The refrigerant discharged from the evaporator 46 may be discharged to the compressor 48 after passing through the internal heat exchanger 44.

In the instant case, a detector that measures a temperature and a pressure of a refrigerant is separately provided in the refrigerant line 41 that connects the internal heat exchanger 44 and the compressor 48, and the detector can adjust the amount of expansion of the expansion valve 45 by measuring overheat of the refrigerant.

Meanwhile, in the exemplary embodiment of the present invention, a first branch line 30 is provided in the battery coolant line 21 to connect the battery module B with the air conditioner 50 and the heating device 60 through the first valve V1, and closes the connection with the cooling apparatus 10.

The first valve V1 may selectively connect the coolant line 11 and the battery coolant line 21, or selectively connect the battery coolant line 21 and the first branch line 30 to control a flow of the coolant.

That is, when the battery module B is cooled by use of the coolant cooled in the radiator 12, the first valve V1 may connect the coolant line 11 which is connected to the radiator 12 and the battery coolant line 21, and may close the first branch line 30.

Furthermore, when the battery module B is cooled by use of the coolant, which has heat-exchanged with the refrigerant while circulating through the air conditioner 50 and the heating device 60, the first valve V1 may open the first branch line 30, and may close connection between the coolant line 11 and the battery coolant line 21.

In the instant case, the third and fourth valves V3 and V4 may be selectively operated to connect the battery coolant line 21 with the first and second connection lines 52 and 62, respectively.

Accordingly, the coolant of a low-temperature that has heat-exchanged with the refrigerant in the evaporator 46 is introduced into the battery module B through the first branch line 30 opened by the first valve V1, the first connection line 52 connected by the third valve V3, and the battery coolant line 21, such that the battery module B may be effectively cooled.

Conversely, the coolant of the high temperature heat-exchanged with the refrigerant in the sub-condenser 43 may be introduced into the battery module B through the first branch line 30 opened by the first valve V1, the second connection line 62 connected by the fourth valve V4, and the battery coolant line 21 to efficiently heat the battery module B.

Meanwhile, the coolant line 11 is provided with a second branch line 32 that separates the battery coolant line 21 and the coolant line 11 through the second valve V2.

The second branch line 32 may be selectively connectable to the coolant line 11 through the second valve V2 such that the cooling apparatus 10 can form an independently closed circuit through the coolant line 11.

Here, the second valve V2 may include a three-way valve for selectively connecting the coolant line 11, the battery coolant line 21, and the second branch line 32, but this is not limited thereto. The second valve V2 may include a 2-way valve provided at the second branch line 32.

Furthermore, a third branch line 34 connected to the coolant line 11 between the radiator 12 and the first water pump 14 through a fifth valve V5 may be provided at the coolant line 11 that connects the electrical equipment 15 with the radiator 12.

The third branch line 34 is selectively opened through operation of the fifth valve V5 when the temperature of the coolant is increased by absorbing waste heat generated from the electrical equipment 26 and the battery module B. In the instant case, the coolant line 11 connected to the radiator 12 is closed by operation of the fifth valve V5.

Meanwhile, a reservoir tank 19 which is connected to the third branch line 34 may be provided between the radiator 12 and the main heat exchanger 42. The reservoir tank 19 may store a cooled coolant introduced from the radiator 12.

Here, the first, second and fifth valve V1, V2, and V5 may be three-way valves configured for controlling a flow rate.

Furthermore, although the present exemplary embodiment has described that the second valve V2 is configured to selectively open or close the second branch line 32 as an exemplary embodiment of the present invention, the present invention is not limited thereto. The second valve V2 may be omitted if necessary.

That is, when the second valve V2 is omitted, the second branch line 34 may control a flow rate of the coolant circulating through operations of the coolant line 11, the battery coolant line 21, and the first, second, and third branch lines 30, 32 and 34, and the first, second, and third water pumps 14, 56, 66 selectively connectable to each other according to each mode of the vehicle (heating, cooling, dehumidification) to control opening of the second branch line 32.

Hereinafter, an operation in each mode of the heat pump system 1 for a vehicle according to an exemplary embodiment of the present invention configured as above will be described with reference to FIG. 2 to FIG. 8.

First, an operation of cooling the battery module B together with the electrical equipment 15 in a cooling mode of the vehicle is described with reference to FIG. 2.

Figure 2:
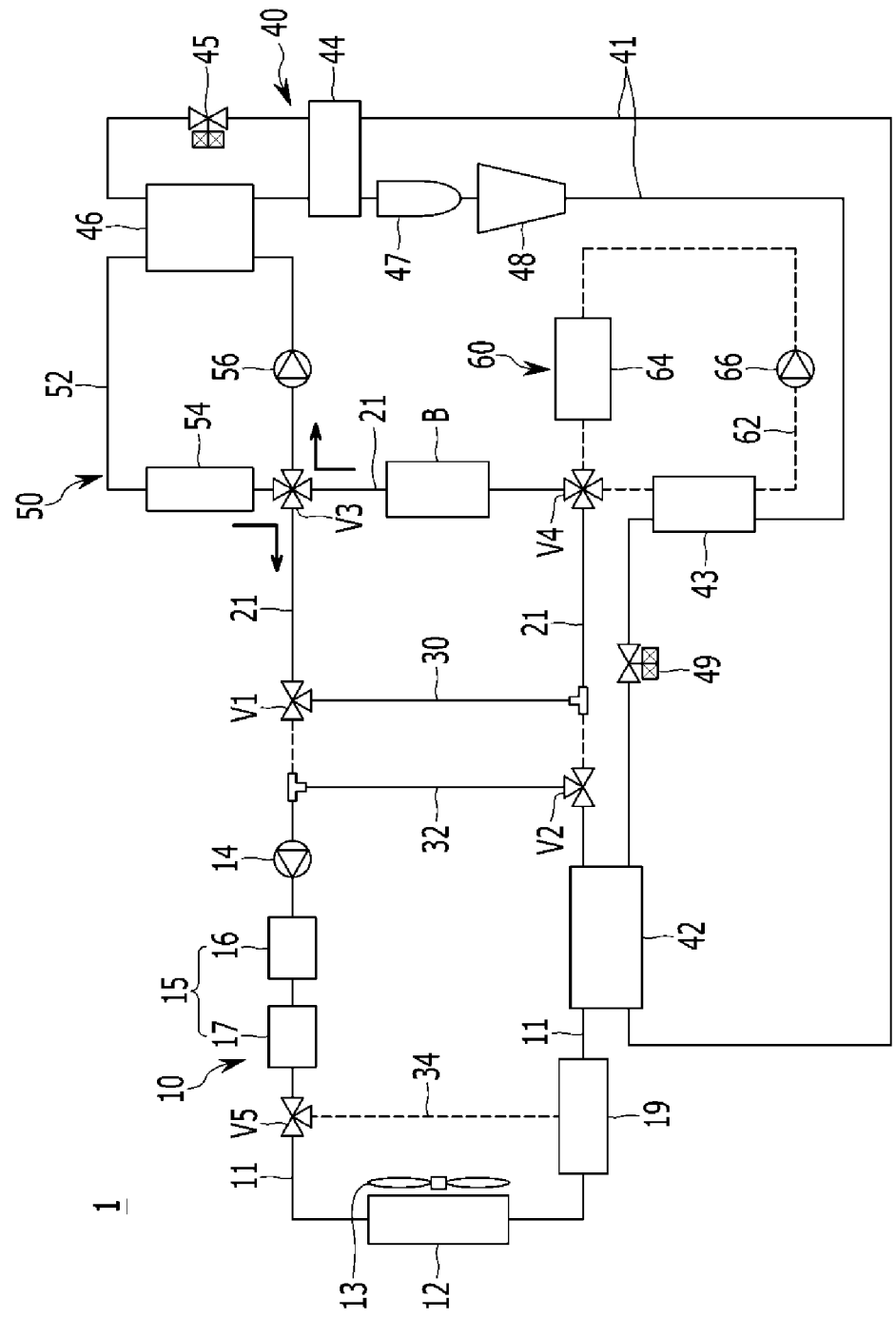
FIG. 2 is an operating state diagram illustrating an operation of cooling the battery module in the cooling mode of the vehicle in the heat pump system for the vehicle according to an exemplary embodiment of the present invention.

FIG. 2 is an operating state diagram illustrating an operation of cooling the battery module in the cooling mode of the vehicle in the heat pump system for the vehicle according to an exemplary embodiment of the present invention.

Referring to FIG. 2, the cooling apparatus 10 operates to cool the electrical equipment 15. Each constituent element of the CE module 40 operates to cool the internal of the vehicle, and the refrigerant circulates along the refrigerant line 41.

The first and second branch line 30 and 32 are opened by operation of the first and second valves V1 and V2.

Furthermore, the connection of the coolant line 11 with the battery coolant line 21 is closed by operation of the first and second third valves V1 and V2.

The first connection line 52 is connected to the battery coolant line 21 connected to the battery module B by operation of the third valve V3.

Furthermore, the connection of the second connection line 62 with the battery coolant line 21 is closed by operation of the fourth valve V4. In the heating device 60, the third water pump 66 stops operating, and flow of the coolant is stopped in the second connection line 62.

The main heat exchanger 42 of the CE module 40 condenses the refrigerant by use of the coolant introduced along the coolant line 11. Furthermore, the sub-condenser 43 and the sub-expansion valve 49 stop operating as the operation of the heating device 60 is stopped.

The third branch line 34 is closed by operation of the fifth valve V5. Simultaneously, the fifth valve V5 opens the coolant line 11 that connects the electrical equipment 15 and the radiator 12.

Accordingly, the coolant cooled in the radiator 12 may circulate along the coolant line 11 which is connected to the second branch line 32 opened through the second valve V2 by operation of the first water pump 14.

That is, in the cooling apparatus 10, the second branch line 32 opened by operation of the second valve V2 is connected to the coolant line 11 such that an independent closed circuit may be formed. As such, the coolant cooled in the radiator 12 may cool the electrical equipment 15 while circulating by operation of the first water pump 14.

The coolant in the battery coolant line 21 circulates along the battery coolant line 21, the first branch line 30, and the first connection line 52 by operation of the second water pump 56.

That is, the coolant circulating along the battery coolant line 21 is introduced to the first connection line 52 by operation of the third valve V3 and the second water pump 56.

Accordingly, the coolant may circulate along the battery coolant line 21 and the first connection line 52.

Here, the internal heat exchanger 44 additionally condenses the refrigerant condensed from the main heat exchanger 42 by heat-exchanging the refrigerant with a refrigerant of a low temperature exhausted from the evaporation 46 to further increase a condensation amount through increase of sub-cooling of the refrigerant so that a condensation amount of the refrigerant is increased.

Furthermore, the evaporator 46 heat-exchanges the coolant circulating from the battery coolant line 21 through the first connection line 52 with a refrigerant of a low temperature evaporated inside by the operation of the third valve V3.

The coolant of a low temperature having passed through the evaporator 46 is supplied to the cooler 54 through the first connection line 52 by the operation of the second water pump 56.

That is, the refrigerant circulating through the refrigerant line 41 in the CE module 40 undergoes heat transfer with the coolant having passed through the main heat exchanger 42 to be primarily condensed. Next, the refrigerant exhausted from the main heat exchanger 42 is further heat-exchanged with a refrigerant of a low temperature from the evaporator 46 in the internal heat exchanger 44 so that a condensation amount is further increased.

The coolant having an increased condensation amount is expanded by the expansion valve 45, and is evaporated by the evaporator 46.

In the instant case, the refrigerant evaporated from the evaporator 46 cools the coolant introduced through the first connection line 52. Here, the refrigerant of which a condensation amount is increased while sequentially passing through the main heat exchanger 42 and the internal heat exchanger 44 is expanded and then supplied to the evaporator 46 such that the refrigerant may be evaporated at a lower temperature.

That is, in the exemplary embodiment of the present invention, the internal heat exchanger 44 additionally condenses the refrigerant such that sub-cooling of the refrigerant becomes advantageous.

Furthermore, since the refrigerant of which the sub-cooling is performed is evaporated at a lower temperature in the evaporator 46, a temperature of the coolant which undergoes heat transfer in the evaporator 46 may be further reduced, improving air conditioning performance and efficiency.

Meanwhile, the refrigerant evaporated in the evaporator 46 cools the coolant introduced through the first connection line 52. Accordingly, the coolant is cooled at a low temperature while passing through the evaporator 46, and is then supplied to the cooler 54 through the first connection line 52.

As such, external air introduced into the HVAC module (not shown in the drawing) is cooled while heat-exchanging with the low-temperature coolant introduced to the cooler 54. After that, the cooled external air is directly introduced into the vehicle such that the internal of the vehicle may be cooled.

Meanwhile, the low-temperature coolant having passed through the cooler 54 is introduced into the battery module B while flowing along the battery coolant line 21 connected by operation of the third valve V3. Accordingly, the battery module B may be effectively cooled by the low-temperature coolant supplied through the battery coolant line 21.

An operation of heating the battery module B in an air conditioning mode of the vehicle is described with reference to FIG. 3.

Figure 3:
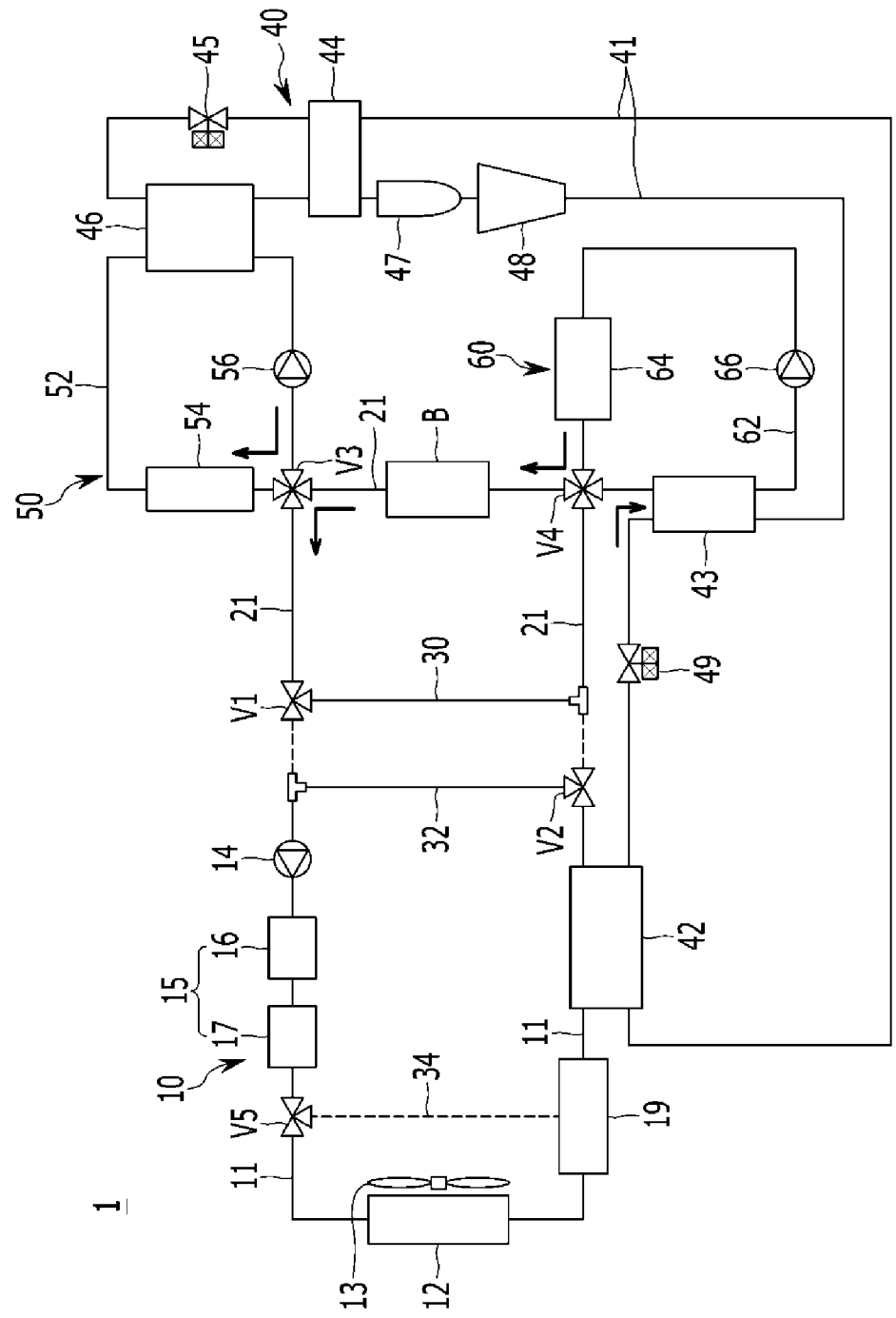
FIG. 3 is an operating state diagram illustrating an operation of heating a battery module in a cooling mode of a vehicle in the heat pump system for a vehicle according to an exemplary embodiment of the present invention.

FIG. 3 is an operating state diagram illustrating an operation of heating a battery module in a cooling mode of a vehicle in the heat pump system for a vehicle according to an exemplary embodiment of the present invention.

Referring to FIG. 3, the cooling apparatus 10 operates to cool the electrical equipment 15. Each constituent element of the CE module 40 operates to cool the internal of the vehicle, and the refrigerant circulates along the refrigerant line 41.

The first and second branch line 30 and 32 are opened by operation of the first and second valves V1 and V2.

Furthermore, the connection of the coolant line 11 with the battery coolant line 21 is closed by operation of the first and second third valves V1 and V2.

The battery coolant line 21 connected to the battery module B and the first connection line 52 form an independent closed circuit by an operation of the third valve V3, respectively.

The second connection line 62 is connected to the battery coolant line 21 by operation of the fourth valve V4. Accordingly, in the heating device 60, the third water pump 66 is operated, and the coolant flows through the second connection line 62.

Furthermore, the third branch line 34 is closed by an operation of the fifth valve V5. Simultaneously, the fifth valve V5 opens the coolant line 11 for connecting the electrical equipment 15 with the radiator 12.

Accordingly, the coolant cooled in the radiator 12 may circulate along the coolant line 11 which is connected to the second branch line 32 opened through the second valve V2 by operation of the first water pump 14.

That is, in the cooling apparatus 10, the second branch line 32 opened by operation of the second valve V2 is connected to the coolant line 11 such that an independent closed circuit may be formed. As such, the coolant cooled in the radiator 12 may cool the electrical equipment 15 while circulating by operation of the first water pump 14.

Meanwhile, the main heat exchanger 42 of the CE module 40 condenses the refrigerant using the coolant flowing through the coolant lines 11.

The sub-condenser 43 heat-exchanges the coolant circulating from the battery coolant line 21 through the second connection line 62 with the refrigerant of a high temperature exhausted from the compressor 48 by an operation of the fourth valve V4 to increase a temperature of the coolant.

The sub-condenser 43 primarily condenses the refrigerant by heat-exchange with the coolant to supply the condensed refrigerant to the main heat exchanger 42.

Moreover, the sub-expansion valve 49 may supply the refrigerant to the main heat exchanger 42 without expansion.

Furthermore, the coolant of the battery coolant line 21 is circulated along the battery coolant line 21, the first branch line 30, and the second connection line 62 by operations of the third water pump 66.

That is, the coolant circulating the battery coolant line 21 flows in the second connection line 62 by operations of the fourth valve V4 and the third water pump 66.

Accordingly, the coolant may circulate through the battery coolant line 21 and the second connection line 62.

Here, the main heat exchanger 42 additionally condenses the condensed refrigerant passed through the sub-condenser 43 by heat-exchanging the condensed refrigerant with the coolant circulating through the coolant lines 11 so that a condensation amount of the refrigerant is increased.

Moreover, the internal heat exchanger 44 further condenses the condensed refrigerant from the main heat exchanger 42 by heat-exchanging the condensed refrigerant with a refrigerant of a low temperature exhausted from the evaporator 46 to further increase the condensation amount through increase of sub-cool so that the condensation amount of the refrigerant is increased.

Furthermore, the evaporator 46 heat-exchanges the coolant circulating through the first connection line 52 with an internally evaporated refrigerant of the low temperature by operations of the third valve V2 and the second water pump 56.

The coolant of a low temperature having passed through the evaporator 46 is supplied to the cooler 54 through the first connection line 52 by the operation of the second water pump 56.

That is, the refrigerant circulating through the refrigerant line 41 in the CE module 40 is condensed by heat-exchanging with the coolant of the second connection line 62 passing through the sub-condenser 43. Next, the condensed refrigerant is further condensed by heat-exchanging with the coolant of the coolant lines 11 passing through the main heat exchanger 42.

Furthermore, the internal heat exchanger 44 further condenses the refrigerant of a medium temperature exhausted from the main heat exchanger 42 by heat-exchanging the condensed refrigerant with a refrigerant of a low temperature exhausted from the evaporator 46 to further increase the condensation amount through increase of sub-cool so that the condensation amount of the refrigerant is increased.

The coolant having an increased condensation amount is expanded by the expansion valve 45, and is evaporated by the evaporator 46.

In the instant case, the refrigerant evaporated from the evaporator cools the coolant introduced through the first connection line 52. Here, in the evaporator 46, the refrigerant having an increased condensation amount sequentially passes through the main heat exchanger 42 and the internal heat exchanger 44 to be expanded and supplied so that the refrigerant may be evaporated at a lower temperature.

That is, in the exemplary embodiment of the present invention, the internal heat exchanger 44 further condenses the refrigerant to be advantageous in terms of forming a sub-cool of the refrigerant.

Furthermore, since the refrigerant formed therein with the sub-cool is evaporated at a lower temperature in the evaporator 46, a temperature of the coolant heat-exchanged from the evaporator 46 may be reduced so that air conditioning performance and efficiency may be improved.

Meanwhile, the refrigerant evaporated from the evaporator 46 cools the coolant introduced through the first connection line 52. Accordingly, the coolant passes through the evaporator 46 to be cooled at a low temperature, and the cooled coolant is supplied to the cooler 54 through the first connection line 52.

As such, an external air introduced into the HVAC module undergoes heat transfer with the coolant of a low temperature introduced into the cooler 54 to be cooled. After that, the cooled external air may be directly introduced into an internal to the vehicle to cool the internal to the vehicle.

Meanwhile, the coolant circulating through the second connection line 62 in the heating device 60 is heat-changed with the refrigerant of a high temperature supplied from the compressor 48 in the sub-condenser 43 so that the temperature of the coolant is increased.

The coolant of a high temperature passed through the sub-condenser 43 is supplied to the heater 64 through the second connection line 62 by an operation of the third water pump 66.

Here, although the coolant of a high temperature is introduced into the heater 64 through the second connection line 62, an opening door included in an HVAC module is closed not to pass the external air through the heater 64, so that interior cooling may be prevented from being deteriorated.

The coolant of a high temperature passed through the heater 64 flows through the battery coolant line 21 connected by operations of the fourth valve V4 and the fifth water pump 70 to be supplied to the battery module B. Accordingly, a temperature of the battery module B may be efficiently increased by the coolant of a high temperature supplied to the battery cooling line 21.

An operation of recovering waste heat of the battery module B and the electrical equipment 15 in a heating mode of the vehicle is described with reference to FIG. 4.

Figure 4:
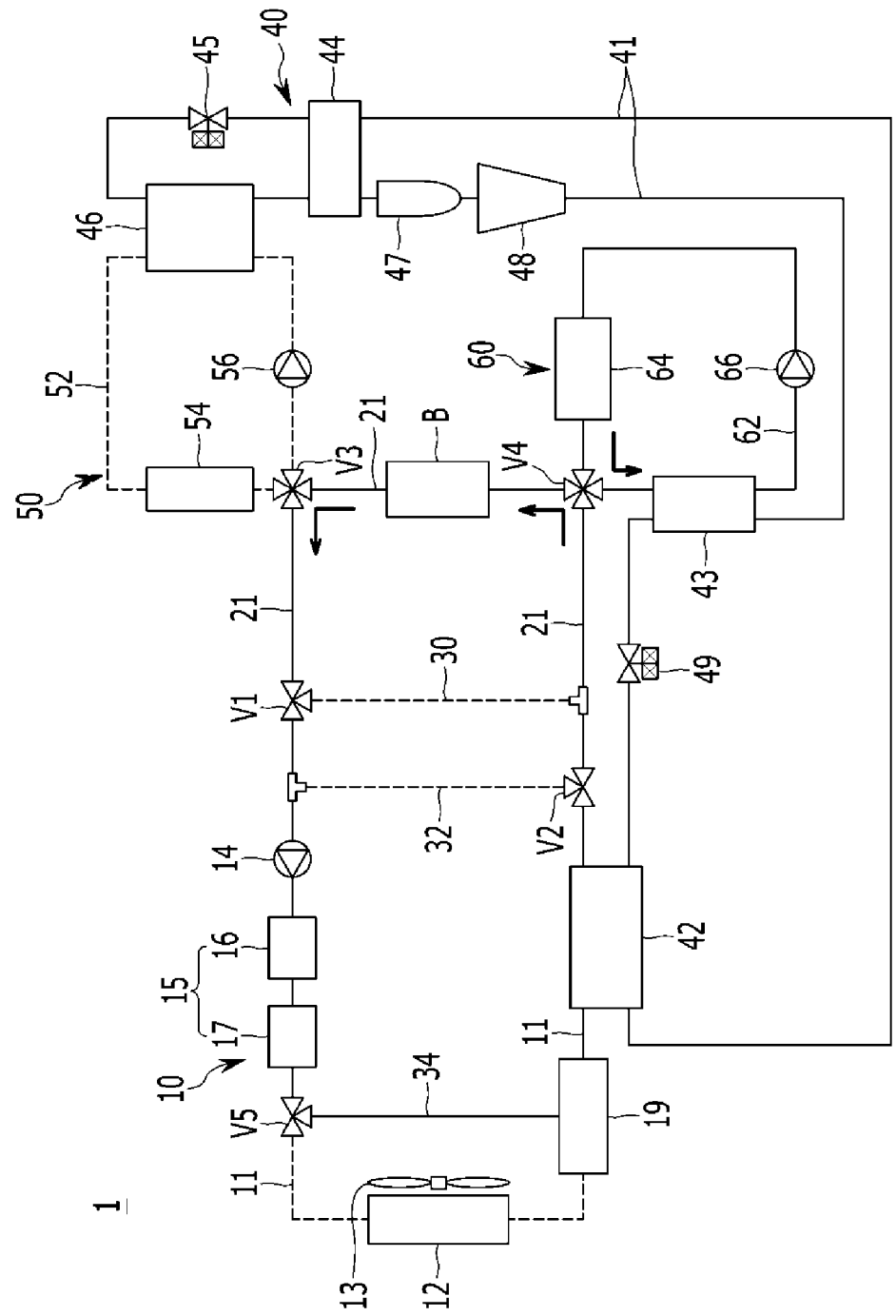
FIG. 4 is an operating state diagram illustrating an operation of recovering waste heat in electrical equipment and a battery module in a heating mode of a vehicle in the heat pump system for a vehicle according to an exemplary embodiment of the present invention.

FIG. 4 is an operating state diagram illustrating an operation of recovering waste heat in electrical equipment and a battery module in a heating mode of a vehicle in the heat pump system for a vehicle according to an exemplary embodiment of the present invention.

Referring to FIG. 4, when waste heat of the electrical equipment 15 and the battery module B is recovered in the heating mode of the vehicle, each constituent element of the CE module 40 is operated to circulate the refrigerant through the refrigerant line 41 to cool an internal to the vehicle.

The first and second branch line 30 and 32 are closed by operations of the first and second valves V1 and V2. Moreover, the coolant line 11 and the battery coolant line 21 are connected to each other by operations of the first and second valves V1 and V2.

The connection of the first connection line 52 with the battery coolant line 21 is closed by an operation of the third valve V3.

Here, in the air conditioner 50, an operation of the second water pump 56 stops, and the flow of the coolant stops in the first connection line 52.

Accordingly, as the operation of the air conditioner 50 stops, operations of the expansion valve 45 and the evaporator 46 also stop.

Furthermore, the battery coolant line 21 and the second connection line 62 form an independent closed circuit by an operation of the fourth valve V4.

Here, in the heating device 60, the coolant may circulate through the second connection line 62 by an operation of the third water pump 66.

Accordingly, a temperature of the coolant circulating through the second connection line 62 in the heating device 60 is increased by heat-exchanging the coolant with the refrigerant of a high temperature supplied to the sub-condenser 43 from the compressor 48.

The coolant of a high temperature passed through the sub-condenser 43 is supplied to the heater 64 through the second connection line 62 by an operation of the third water pump 66.

Meanwhile, the fifth valve V5 closes the coolant line 11 for connecting the electrical equipment 15 with the radiator 12 while opening the third branch line 34.

Accordingly, the coolant line 11 and the battery coolant line 21 may be connected to each other by selective operations of first, second, third, fourth, and fifth valves V1, V2, V3, V4, and V5 to form one closed circuit through the coolant circulates.

Here, the waste heat generated from the electrical equipment 15 and the battery module B increases a temperature of the coolant circulating through the coolant line 11 and the battery coolant line 21.

The coolant having the increased temperature passes through the main heat exchanger 42 by operations of the first water pumps 14 to be recovered while increasing a temperature of the refrigerant exhausted from the main heat exchanger 42.

Here, the condensed refrigerant passed through the sub-condenser 43 by an operation of the sub-expansion valve 49 is supplied into the main heat exchanger 42 in an expanded state. That is, the main heat exchanger 42 performs evaporating the refrigerant.

Accordingly, the refrigerant having an increased temperature passed through the main heat exchanger 42 passes through the internal heat exchanger 44 and the expansion valve 45 through the refrigerant line 41 to be introduced into the compressor 48. In the instant case, the expansion valve 45 may supply the refrigerant to the compressor 48 without expansion.

That is, the coolant having the increased temperature is introduced into the compressor 48, and the compressor 48 compresses the coolant at higher temperature and higher pressure to introduce the compressed coolant to the sub-condenser 43.

Meanwhile, the coolant circulating through the second connection line 62 passes through the sub-condenser 43 to heat-exchange with the refrigerant of the high temperature so that the coolant having an increased temperature is supplied to the heater 64.

Accordingly, an external air introduced into the HVAC module passes through the heater 64 into which the coolant of a high temperature to be heated, and the external air having an increased temperature is introduced into an internal to the vehicle so that the internal to the vehicle may be heated.

That is, the heat pump system 1 according to the present exemplary embodiment of the present invention may use a waste heat source generated from the electrical equipment 15 and the battery module B in a heating mode of the vehicle to increase a temperature of the refrigerant, reducing power consumption of the compressor 48, and improving the heating efficiency.

Meanwhile, although not shown in FIG. 4, when recovering a waste heat from only the electrical equipment 15 in the heating mode of the vehicle, the first branch line 30 is closed by an operation of the first valve V1. Simultaneously, the connection of the coolant line 11 with the battery coolant line 21 is closed by operations of the first and second valves V1 and V2.

Accordingly, the coolant circulates along the coolant line 11 and the second and third branch lines 32, 34 by an operation of the first water pump 14 to receive the waste heat generated from the electrical equipment 15 so that a temperature of the coolant is increased. The coolant having an increased temperature may pass through the main heat exchanger 42 to heat exchange with the refrigerant, increasing a temperature of the refrigerant.

In the exemplary embodiment of the present invention, an operation of increasing a temperature of the battery module B in the heating mode of the vehicle is described with reference to FIG. 5.

Figure 5:
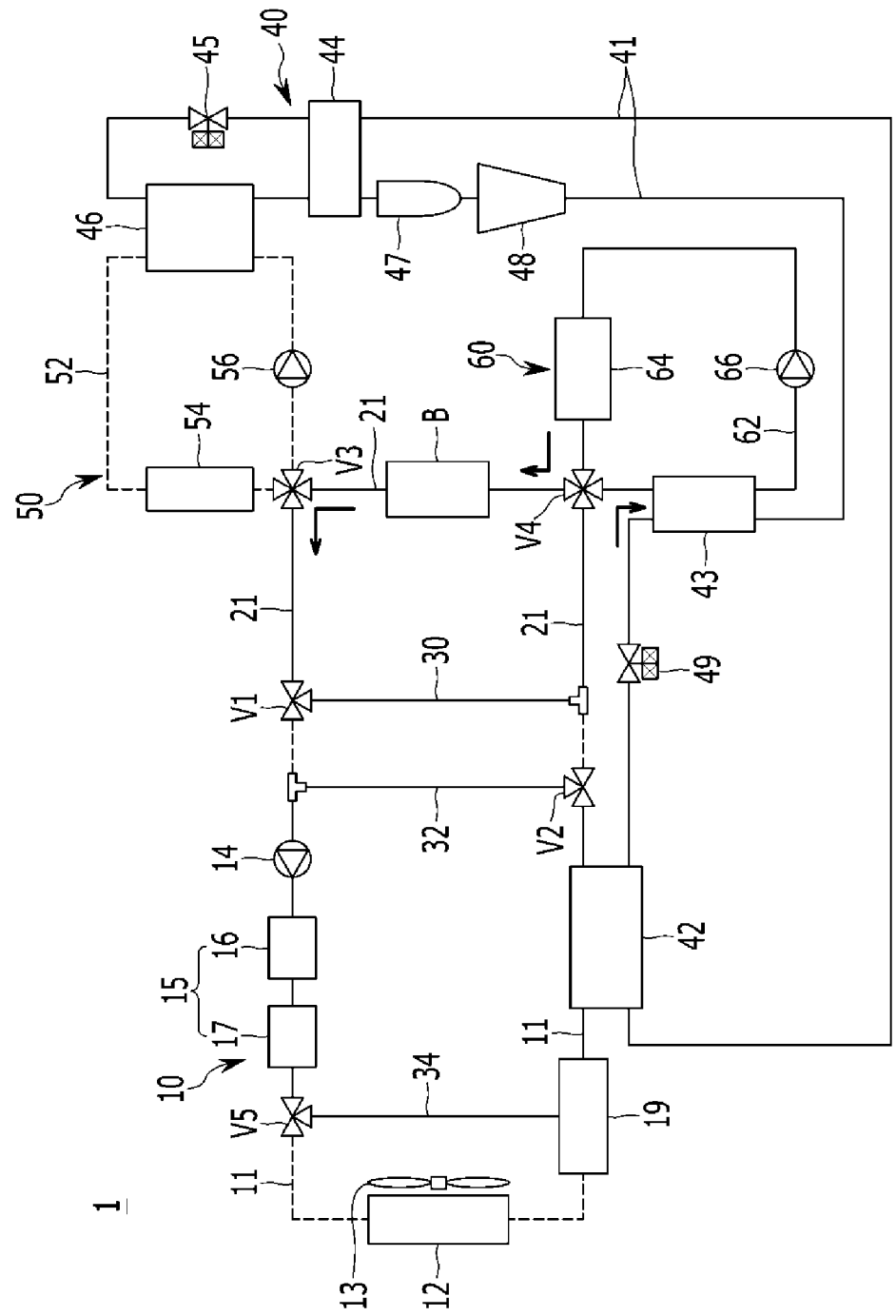
FIG. 5 is an operating state diagram illustrating an operation of heating a battery module in a heating mode of a vehicle in the heat pump system for a vehicle according to an exemplary embodiment of the present invention.

FIG. 5 is an operating state diagram illustrating an operation of heating a battery module in a heating mode of a vehicle in the heat pump system for a vehicle according to an exemplary embodiment of the present invention.

Referring to FIG. 5, when increasing the temperature of the battery module B in the heating mode of the vehicle, each constituent element of the CE module 40 is operated to circulate the refrigerant through the refrigerant line 41 to cool an internal to the vehicle.

Here, the first and second branch line 30 and 32 are closed by operations of the first and second valves V1 and V2.

Moreover, the connection of the coolant line 11 with the battery coolant line 21 is closed by operations of the first and second valves V1 and V2.

The connection of the first connection line 52 with the battery coolant line 21 is closed by an operation of the third valve V3.

Here, in the air conditioner 50, an operation of the second water pump 56 stops, and the flow of the coolant stops in the first connection line 52.

Accordingly, as the operation of the air conditioner 50 stops, operations of the expansion valve 45 and the evaporator 46 also stop.

Meanwhile, the battery coolant line 21 is connected to the second connection line 62 by an operation of the fourth valve V4.

Here, in the heating device 60, the coolant may circulate through the second connection line 62 by an operation of the third water pump 66.

Accordingly, the coolant circulating through the second connection line 62 in the heating device 60 undergoes heat transfer with the refrigerant of a high temperature supplied to the sub-condenser 43 from the compressor 48 so that a temperature of the coolant is increased.

The coolant of the high temperature passed through the sub-condenser 43 is supplied to the heater 64 through the second connection line 62 by an operation of the fourth water pump 66.

Meanwhile, the fifth valve V5 closes the coolant line 11 for connecting the electrical equipment 15 with the radiator 12 while opening the third branch line 34.

Accordingly, the coolant line 11 and the battery coolant line 21 may form independent closed circuits by selective operations of the first, second, third, fourth, and fifth valves V1, V2, V3, V4, and V5, respectively.

That is, in the cooling apparatus 10, the second and third branch lines 32 and 34 opened by the operation of the second valve V2 may be connected to the coolant line 11 to form an independent closed circuit.

Accordingly, the coolant circulates through the coolant line 11 by an operation of the first water pump 14 without passing through the radiator 12.

Here, the waste heat generated from the electrical equipment 15 increases a temperature of the coolant circulating through the coolant line 11.

The coolant having an increased temperature passes through the main heat exchanger 42 by an operation of the first water pump 14 to be recovered while increasing a temperature of the refrigerant exhausted from the main heat exchanger 42.

The condensed refrigerant passed through the sub-condenser 43 by the operation of the sub-expansion valve 49 is supplied to the main heat exchanger 42 in an expanded state. That is, the main heat exchanger 42 performs evaporating the refrigerant.

Accordingly, the refrigerant having an increased temperature passed through the main heat exchanger 42 passes through the internal heat exchanger 44 and the expansion valve 45 through the refrigerant line 41 to be introduced into the compressor 48. In the instant case, the expansion valve 45 may supply the refrigerant to the compressor 48 without expansion.

That is, the coolant having the increased temperature is introduced into the compressor 48, and the compressor 48 compresses the coolant at higher temperature and higher pressure to introduce the compressed coolant to the sub-condenser 43.

Meanwhile, the coolant circulating through the second connection line 62 passes through the sub-condenser 43 to heat-exchange with the refrigerant of the high temperature so that the coolant having an increased temperature is supplied to the heater 64.

Accordingly, the external air introduced into the HVAC module undergoes heat transfer with the coolant of a high temperature introduced into the heater 64 to be heated. Next, the external air having an increased temperature may be directly introduced into an internal to the vehicle to heat the internal to the vehicle.

Here, the coolant of a high temperature passed through the heater 64 flows through the battery coolant line 21 connected by operations of the fourth valve V4 to be supplied to the battery module B. Accordingly, a temperature of the battery module B may be efficiently increased by the coolant of a high temperature supplied to the battery coolant line 21.

That is, the heat pump system 1 according to the present exemplary embodiment of the present invention may use a waste heat source generated from the electrical equipment 15 in a heating mode of the vehicle to increase a temperature of the refrigerant, reducing power consumption of the compressor 48, and improving the heating efficiency.

In the exemplary embodiment of the present invention, an operation of cooling the battery module B in a heating mode of the vehicle is described with reference to FIG. 6.

Figure 6:
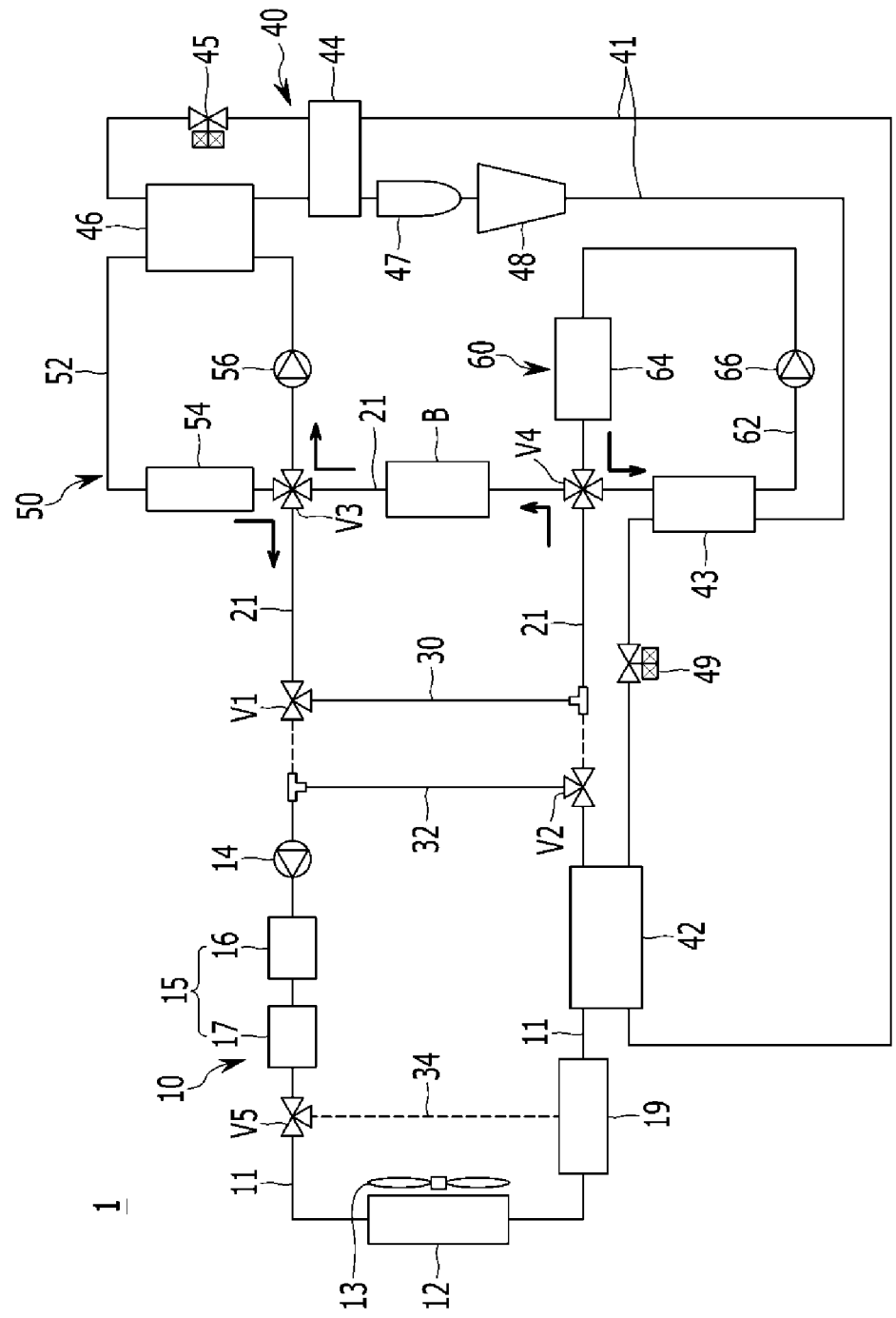
FIG. 6 is an operating state diagram illustrating an operation of cooling a battery module in a heating mode of a vehicle in the heat pump system for a vehicle according to an exemplary embodiment of the present invention.

FIG. 6 is an operating state diagram illustrating an operation of cooling a battery module in a heating mode of a vehicle in the heat pump system for a vehicle according to an exemplary embodiment of the present invention.

Referring to FIG. 6, when cooling the battery module B in the heating mode of the vehicle, the cooling apparatus 10 is operated to cool the electrical equipment 15.

Furthermore, each constituent element of the CE module 40 is operated to circulate the refrigerant through the refrigerant line 41 to cool an internal to the vehicle.

The first and second branch line 30 and 32 are opened by operations of the first and second valves V1 and V2.

Moreover, the connection of the coolant line 11 with the battery coolant line 21 is closed by operations of the first and second valves V1 and V2.

The first connection line 52 is connected to the battery coolant line 21 connected to the battery module B by an operation of the third valve V3.

Furthermore, the battery coolant line 21 connected to the battery module B and the second connection line 62 form a closed circuit by an operation of the fourth valve V4.

Accordingly, a temperature of the coolant circulating through the second connection line 62 in the heating device 60 is increased by heat-exchanging the coolant with the refrigerant of a high temperature supplied to the sub-condenser 43 from the compressor 48.

The coolant of a high temperature passed through the sub-condenser 43 is supplied to the heater 64 through the second connection line 62 by an operation of the third water pump 66.

Accordingly, the external air introduced into the HVAC module undergoes heat transfer with the coolant of a high temperature introduced into the heater 64 to be heated. Next, the external air having an increased temperature may be directly introduced into an internal to the vehicle to heat the internal to the vehicle.

Meanwhile, the third branch line 34 is closed by an operation of the fifth valve V5. Simultaneously, the fifth valve V5 opens the coolant line 11 for connecting the electrical equipment 15 with the radiator 12.

Accordingly, the coolant cooled in the radiator 12 may circulate along the coolant line 11 which is connected to the second branch line 32 opened through the second valve V2 by operation of the first water pump 14.

That is, in the cooling apparatus 10, the second branch line 32 opened by operation of the second valve V2 is connected to the coolant line 11 such that an independent closed circuit may be formed.

As such, the coolant cooled in the radiator 12 may cool the electrical equipment 15 while circulating by operation of the first water pump 14.

The coolant in the battery coolant line 21 circulates along the battery coolant line 21, the first branch line 30, and the first connection line 52 by operation of the second water pump 56.

That is, the coolant circulating along the battery coolant line 21 is introduced to the first connection line 52 by operation of the third valve V3 and the second water pump 56.

Accordingly, the coolant may circulate along the battery coolant line 21 and the first connection line 52.

Meanwhile, the main heat exchanger 42 of the CE module 40 condenses the refrigerant using the coolant flowing through the coolant lines 11.

The sub-condenser 43 heat-exchanges the coolant circulating from the battery coolant line 21 through the second connection line 62 with the refrigerant of a high temperature exhausted from the compressor 48 by an operation of the fourth valve V4 to increase a temperature of the coolant.

The sub-condenser 43 primarily condenses the refrigerant by heat-exchange with the coolant to supply the condensed refrigerant to the main heat exchanger 42.

Moreover, the sub-expansion valve 49 may supply the refrigerant to the main heat exchanger 42 without expansion.

Here, the main heat exchanger 42 additionally condenses the condensed refrigerant passed through the sub-condenser 43 by heat-exchanging the condensed refrigerant with the coolant circulating through the coolant lines 11 so that a condensation amount of the refrigerant is increased.

Moreover, the internal heat exchanger 44 further condenses the condensed refrigerant from the main heat exchanger 42 by heat-exchanging the condensed refrigerant with a refrigerant of a low temperature exhausted from the evaporator 46 to further increase the condensation amount through increase of sub-cool so that the condensation amount of the refrigerant is increased.

Furthermore, the evaporator 46 heat-exchanges the coolant circulating through the first connection line 52 with an internally evaporated refrigerant of the low temperature by operations of the third valve V2 and the second water pump 56.

The coolant of a low temperature having passed through the evaporator 46 is supplied to the cooler 54 through the first connection line 52 by the operation of the second water pump 56.

That is, the refrigerant circulating through the refrigerant line 41 in the CE module 40 is condensed by heat-exchanging with the coolant of the second connection line 62 passing through the sub-condenser 43.

Next, the condensed refrigerant is further condensed by heat-exchanging with the coolant of the coolant lines 11 passing through the main heat exchanger 42.

Furthermore, the internal heat exchanger 44 further condenses the refrigerant of a medium temperature exhausted from the main heat exchanger 42 by heat-exchanging the condensed refrigerant with a refrigerant of a low temperature exhausted from the evaporator 46 to further increase the condensation amount through increase of sub-cool so that the condensation amount of the refrigerant is increased.

The coolant having an increased condensation amount is expanded by the expansion valve 45, and is evaporated by the evaporator 46.

In the instant case, the refrigerant evaporated from the evaporator cools the coolant introduced through the first connection line 52.

Here, in the evaporator 46, the refrigerant having an increased condensation amount sequentially passes through the main heat exchanger 42 and the internal heat exchanger 44 to be expanded and supplied so that the refrigerant may be evaporated at a lower temperature.

That is, in the exemplary embodiment of the present invention, the internal heat exchanger 44 further condenses the refrigerant to be advantageous in terms of forming a sub-cool of the refrigerant.

Meanwhile, the refrigerant evaporated from the evaporator 46 cools the coolant introduced through the first connection line 52. Accordingly, the coolant passes through the evaporator 46 to be cooled at a low temperature, and the cooled coolant is supplied to the cooler 54 through the first connection line 52.

Here, although the coolant of a low temperature is introduced into the cooler 54 through the first connection line 52, an opening door included in an HVAC module is closed not to pass the external air through the cooler 54, so that interior heating may be prevented from being deteriorated.

The coolant of a low temperature passed through the cooler 54 flows through the battery coolant line 21 connected by operations of the third valve V3 to be supplied to the battery module B.

Accordingly, the battery module B may be effectively cooled by the low-temperature coolant supplied through the battery coolant line 21.

In the exemplary embodiment of the present invention, an operation in a dehumidification mode of the vehicle is described with reference to FIG. 7.

Figure 7:
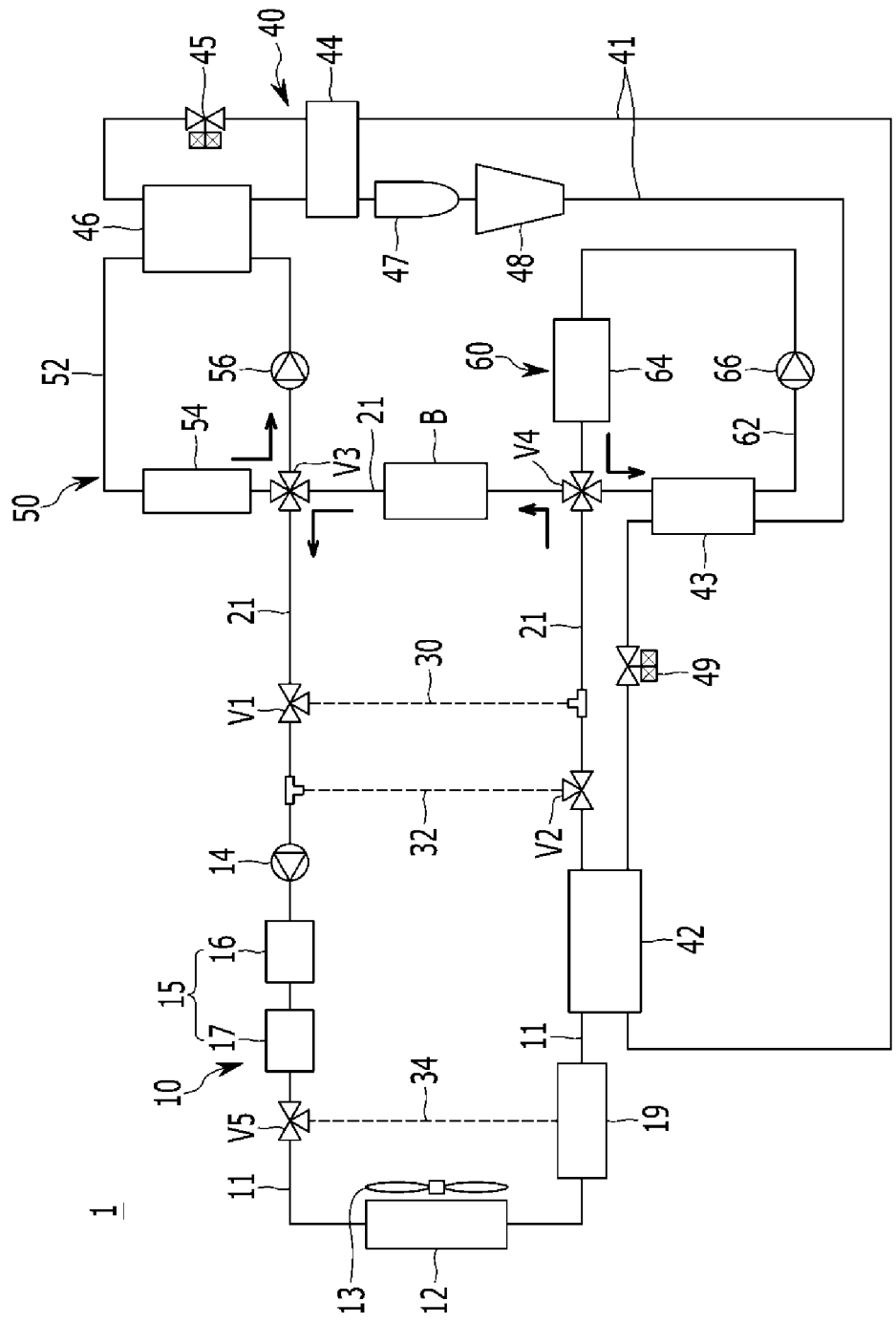
FIG. 7 is an operating state diagram illustrating an operation of a dehumidification mode of a vehicle in the heat pump system for a vehicle according to an exemplary embodiment of the present invention.

FIG. 7 is an operating state diagram illustrating an operation of a dehumidification mode of a vehicle in the heat pump system for a vehicle according to an exemplary embodiment of the present invention.

Referring to FIG. 7, the cooling apparatus 10 is operated to cool the electrical equipment 15. Furthermore, each constituent element of the CE module 40 is operated to circulate the refrigerant through the refrigerant line 41 to cool an internal to the vehicle.

Here, the first and second branch line 30 and 32 are closed by operations of the first and second valve V1 and V2.

Furthermore, the coolant line 11 is connected to the battery coolant line 21 by operations of the first and second valve V1 and V2.

The battery coolant line 21 and the first connection line 52 forms an independent closed circuit by an operation of the third valve V3, respectively.

Furthermore, the battery coolant line 21 and the second connection line 62 form an independent closed circuit by an operation of the fourth valve V4, respectively.

Here, in the air conditioner 50 and the heating device 60, the coolant may circulate along the first and second connection lines 52 and 62 by operations of the second and third water pumps 56 and 66, respectively.

The third branch line 34 is closed by an operation of the fifth valve V5. Simultaneously, the fifth valve V5 opens the coolant line 11 connecting the electrical equipment 15 and the radiator 12.

Accordingly, the coolant line 11 and the battery coolant line 21 may be connected to each other by selective operations of first, second, third, fourth, and fifth valves V1, V2, V3, V4, and V5 to form one closed circuit through the coolant circulates.

The coolant cooled from the radiator 12 may circulate through the coolant line 11 and the battery coolant line 31 by an operation of the first water pump 14.

Meanwhile, the main heat exchanger 42 of the CE module 40 condenses the refrigerant using the coolant flowing through the coolant lines 11.

The sub-condenser 43 heat-exchanges the coolant circulating from the battery coolant line 21 through the second connection line 62 with the refrigerant of a high temperature exhausted from the compressor 48 by an operation of the fourth valve V4 to increase a temperature of the coolant.

The sub-condenser 43 primarily condenses the refrigerant by heat-exchange with the coolant to supply the condensed refrigerant to the main heat exchanger 42.

Moreover, the sub-expansion valve 49 may supply the refrigerant to the main heat exchanger 42 without expansion.

The main heat exchanger 42 additionally condenses the condensed refrigerant passed through the sub-condenser 43 by heat-exchanging the condensed refrigerant with the coolant circulating through the coolant lines 11 so that a condensation amount of the refrigerant is increased.

Moreover, the internal heat exchanger 44 further condenses the condensed refrigerant from the main heat exchanger 42 by heat-exchanging the condensed refrigerant with a refrigerant of a low temperature exhausted from the evaporator 46 to further increase the condensation amount through increase of sub-cool so that the condensation amount of the refrigerant is increased.

Furthermore, the evaporator 46 heat-exchanges the coolant circulating through the first connection line 52 with an internally evaporated refrigerant of the low temperature by operations of the third valve V2 and the second water pump 56.

The coolant of a low temperature having passed through the evaporator 46 is supplied to the cooler 54 through the first connection line 52 by the operation of the second water pump 56.

That is, the refrigerant circulating through the refrigerant line 41 in the CE module 40 is condensed by heat-exchanging with the coolant of the second connection line 62 passing through the sub-condenser 43.

Next, the condensed refrigerant is further condensed by heat-exchanging with the coolant of the coolant lines 11 passing through the main heat exchanger 42.

Furthermore, the internal heat exchanger 44 further condenses the refrigerant of a medium temperature exhausted from the main heat exchanger 42 by heat-exchanging the condensed refrigerant with a refrigerant of a low temperature exhausted from the evaporator 46 to further increase the condensation amount through increase of sub-cool so that the condensation amount of the refrigerant is increased.

The coolant having an increased condensation amount is expanded by the expansion valve 45, and is evaporated by the evaporator 46.

In the instant case, the refrigerant evaporated from the evaporator cools the coolant introduced through the first connection line 52.

Here, in the evaporator 46, the refrigerant having an increased condensation amount sequentially passes through the main heat exchanger 42 and the internal heat exchanger 44 to be expanded and supplied so that the refrigerant may be evaporated at a lower temperature.

That is, in the exemplary embodiment of the present invention, the internal heat exchanger 44 further condenses the refrigerant to be advantageous in terms of forming a sub-cool of the refrigerant.

Meanwhile, the refrigerant evaporated from the evaporator 46 cools the coolant introduced through the first connection line 52. Accordingly, the coolant passes through the evaporator 46 to be cooled at a low temperature, and the cooled coolant is supplied to the cooler 54 through the first connection line 52.

Furthermore, the coolant circulating through the second connection line 62 in the heating device 60 is heat-changed with the refrigerant of a high temperature supplied from the compressor 48 in the sub-condenser 43 so that the temperature of the coolant is increased.

The coolant of a high temperature passed through the sub-condenser 43 is supplied to the heater 64 through the second connection line 62 by an operation of the third water pump 66.

In the present state, an opening door included in the HVAC module (not show) is open to pass the external air through both of the cooler 54 and the heater 64.

Accordingly, the external air introduced into the HVAC module passes through the cooler 54 into which the coolant of a low temperature is introduced and the heater 64 into which the coolant of a high temperature is introduced to be dehumidified, and the dehumidified external air is introduced into the internal to the vehicle to dehumidify the internal to the vehicle.

Meanwhile, although not shown in the drawings, when an external temperature is low in a dehumidification mode, the third branch line 34 closed may be open by an operation of the fifth valve V5. The coolant line 11 connecting the electrical equipment 15 with radiator 12 may be closed.

Next, an operation of increasing a temperature of the battery module B in a state that a cooling or heating mode of the vehicle stops is described with reference to FIG. 8.

Figure 8:
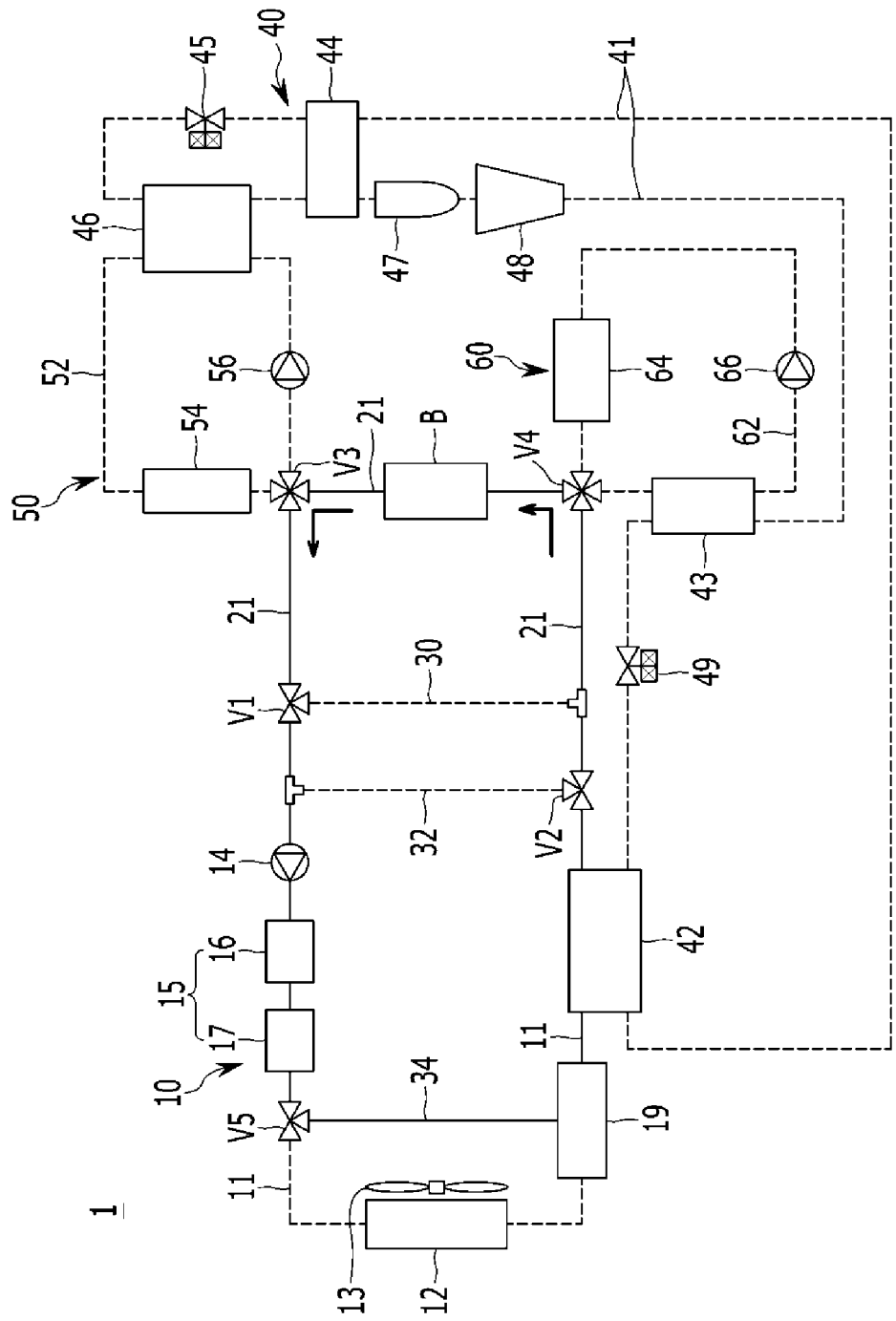
FIG. 8 is an operating state diagram illustrating an operation of heating a battery module when a cooling mode or a heating mode of a vehicle is not operated in the heat pump system for a vehicle according to an exemplary embodiment of the present invention.

FIG. 8 is an operating state diagram illustrating an operation of heating a battery module when a cooling mode or a heating mode of a vehicle is not operated in the heat pump system for a vehicle according to an exemplary embodiment of the present invention.

Referring to FIG. 8, when the temperature of the battery module (B) is raised while the cooling or heating mode of the vehicle is not operated, the CE module (40) stops operating, stopping the circulation of the refrigerant.

The first and second branch line 30 and 32 are closed by operations of the first and second valve V1 and V2. Furthermore, the coolant line 11 is connected to the battery coolant line 21 by operations of the first and second valve V1 and V2.

The connection of the first and second branch line 52 and 62 with the battery coolant line 21 is closed by operations of the third and fourth valve V3 and V4.

Here, in the air conditioner 50 and the heating device 60, operations of the second and third water pump 54 and 64 stop. Accordingly, in the first and second branch line 52 and 62, the flow of the coolant is stop.

The fifth valve V5 closes the coolant line 11 for connecting the electrical equipment 15 with the radiator 12 while opening the third branch line 34.

Accordingly, the coolant line 11 and the battery coolant line 21 may be connected to each other by selective operations of first, second, third, fourth, and fifth valves V1, V2, V3, V4, and V5 to form one closed circuit through the coolant circulates.

Here, the waste heat generated from the electrical equipment 15 and the battery module B increases a temperature of the coolant circulating through the coolant line 11 and the battery coolant line 21.

The coolant having the increased temperature passes through the battery module B, while circulating along the coolant line 11 and the battery coolant line 21 by operation of the first water pump 14. Accordingly, a temperature of the battery module B may be efficiently increased by the coolant of a high temperature supplied to the battery coolant line 21.

As described above, in the heat pump system 1 for a vehicle according to an exemplary embodiment of the present invention is applied, a system may be simplified and a layout of connection pipes in which a coolant circulates may be simplified by selectively heat-exchanging thermal energy generated from a refrigerant with a coolant upon condensation and evaporation of the refrigerant to control an internal temperature of the vehicle using the heat-exchanged coolant of a low temperature or a high temperature.

Furthermore, the heat pump system 1 may improve heating efficiency of the vehicle using waste heat of the electrical equipment 15 and a battery module B, and may increase the whole travel distance of the vehicle through efficient temperature control of a battery module to obtain the optimal performance of the battery module B.

Moreover, the present invention may reduce a size and a weight by packaging a Centralized Energy Module (CE module) 40 for generating thermal energy through condensing and evaporation of a coolant.

Furthermore, the present invention may prevent noise, vibration and operational instability from being generated as compared with an air conditioner according to the related art by use of an R152-a, or an R744, or an R290 of the high performance in a CE module 40.

Furthermore, the present invention may increase sub-cool of a refrigerant to improve cooling performance and efficiency by configuring a sub-condenser 43 and an internal heat exchanger 44 together to increase a condensation amount of the refrigerant in the CE module 40.

Furthermore, the present invention may reduce a manufacturing cost and a weight, and may improve space utilization by simplifying the entire system.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A heat pump system of a vehicle comprising:
    a cooling apparatus including a radiator and a first water pump which are connected to a coolant line, to circulate a coolant through the coolant line;
    a battery module provided in a battery coolant line selectively connectable to the coolant line through a first valve;
    an air conditioner selectively connectable to the battery coolant line through a third valve, wherein the air conditioner is connected to a first connection line for cooling an inside of the vehicle by selectively forming an independent closed circuit, and wherein a second water pump and a cooler are provided in the first connection line;
    a heating device selectively connectable to the battery coolant line through a fourth valve, wherein the heating device is connected to a second connection line for heating an inside of the vehicle by selectively forming the independent closed circuit, and wherein a third water pump and a heater are provided in the second connection line; and
    a centralized energy (CE) module connected to a refrigerant line adjacent to the coolant line and the first and second connection lines to supply a first portion of the coolant at a first temperature to the air conditioner, and to supply a second portion of the coolant at a second temperature to the heating device, and to selectively heat-exchanging thermal energy generated upon condensing and evaporation of a refrigerant circulating inside of the refrigerant line with the coolant.

2. The heat pump system of the vehicle of claim 1, wherein the cooling apparatus cools electrical equipment or cools the battery module by use of the coolant that circulates along the coolant line.

3. The heat pump system of the vehicle of claim 1, wherein the CE module includes:
    a main heat exchanger provided in the coolant line between the radiator and the battery module, and evaporating or condensing the refrigerant;
    an expansion valve connected to the main heat exchanger through the refrigerant line;
    an evaporator which is connected to the expansion valve through the refrigerant line, and provided in the first connection line to cool the first portion of the coolant that circulates along the first connection line in the air conditioner; and
    a compressor which is provided in the refrigerant line between the evaporator and the main heat exchanger.

4. The heat pump system for the vehicle of claim 3, wherein an internal heat exchanger is provided in the refrigerant line between the evaporator and the compressor.

5. The heat pump system for the vehicle of claim 3, wherein
    the first valve selectively connects the coolant line and the battery coolant line between the radiator and the battery module, and
    the third and fourth valves are provided in the battery coolant line while interposing the battery module therebetween and selectively connects the battery coolant line with the first and second connection lines.

6. The heat pump system for the vehicle of claim 4, wherein the internal heat exchanger is connected to the refrigerant line that connects the main heat exchanger and the expansion valve and the refrigerant line that connects the evaporator and the compressor, and
    when the main heat exchanger condenses the refrigerant, the internal heat exchanger additionally condenses the refrigerant condensed in the main heat exchanger through heat-exchange with the refrigerant discharged from the evaporator, and introduces the additionally condensed refrigerant to the expansion valve.

7. The heat pump system of the vehicle of claim 4, wherein the CE module includes:
   a sub-condenser connected to the compressor through the refrigerant line between the main heat exchanger and the compressor, and provided at the second connection line wherein the heating device heats the second portion of the coolant circulating through the second connection line; and
   a sub-expansion valve provided at the refrigerant line between the sub-condenser and the main heat exchanger.

8. The heat pump system of the vehicle of claim 7, wherein,
   in the battery coolant line, a first branch line that connects the battery module with the air conditioner and the heating device through the first valve and closes connection with the cooling apparatus is provided,
   in the coolant line, a second branch line that separates the battery coolant line and the coolant line is provided, and
   a third branch line which is connected to the coolant line between the radiator and the first water pump through a fifth valve is provided in the coolant line that connects electrical equipment.

9. The heat pump system for the vehicle of claim 8, wherein, when the battery module is cooled with the electrical equipment in a cooling mode of the vehicle,
   the first branch line is opened by operation of the first valve, the second branch line is opened, and the connection between the coolant line and the battery coolant line is closed by the opened first and second branch lines,
   the battery coolant line connected to the battery module is connected to the first connection line by an operation of the third valve,
   the connection between the battery coolant line and the second connection line is closed by an operation of the fourth valve,
   the third branch line is closed by an operation of the fifth valve, and
   the refrigerant is circulated, the main heat exchanger condenses the refrigerant, and the sub-condenser and the sub-expansion valve stop operation in the CE module.

10. The heat pump system of the vehicle of claim 9, wherein the evaporator heat-exchanges the first portion of the coolant circulating through the first connection line from the battery coolant line by an operation of the third valve with an internally evaporated refrigerant to cool the first portion of the coolant,
   a cooled coolant passed through the evaporator is supplied to the cooler along the first connection line by an operation of the second water pump, and
   a cooled coolant passed through the cooler is supplied to the battery module along the battery coolant line which is connected to the first connection line by operation of the third valve to cool the battery module.

11. The heat pump system for the vehicle of claim 9, wherein,
   in the cooling apparatus,
   the opened second branch line is connected to the coolant line such that an independent closed circuit is formed, and the coolant cooled in the radiator cools the electrical equipment while circulating by operation of the first water pump.

12. The heat pump system of the vehicle of claim 9, wherein,
   when the temperature of the battery module is raised by use of a waste heat of the electrical equipment while the cooling or heating mode of the vehicle is not operated,
   the circulation of the refrigerant is stopped in the CE module,
   the first branch line is closed by an operation of the first valve, the second branch line is closed, and the coolant line is connected to the battery coolant line through the closed first and second branch lines,
   the connection between the battery coolant line and the first and second connection lines is closed by an operation of the third and fourth valves, and
   in a state that the third branch line is opened by an operation of the fifth valve, the coolant line for connecting the electrical equipment with the radiator is closed.

13. The heat pump system of the vehicle of claim 8, wherein,
   when increasing a temperature of the battery module in a cooling mode of the vehicle,
   the first branch line is opened by an operation of the first valve, the second branch line is opened, and the connection between the coolant line and the battery coolant line is closed by the opened first and second branch lines,
   the battery coolant line connected to the battery module and the first connection line form an independent closed circuit by an operation of the third valve,
   the battery coolant line is connected to the second connection line by an operation of the fourth valve,
   the third branch is closed by operation of the fifth valve, and
   the refrigerant is circulated, the main heat exchanger and the sub-condenser condense the refrigerant, and the sub-expansion valve stop operation in the CE module.

14. The heat pump system of the vehicle of claim 13, wherein,
   the sub-condenser heat-exchanges the second portion of the coolant circulating the second connection line from the battery coolant line by an operation of the fourth valve with the refrigerant supplied from the compressor to heat the second portion of the coolant,
   the second portion of the coolant from the sub-condenser is supplied to the heater through the second connection line by an operation of the third water pump, and
   the second portion of the coolant from the heater is supplied to the battery module through the battery coolant line connected by an operation of the fourth valve to increase a temperature of the battery module.

15. The heat pump system of the vehicle of claim 8, wherein,
   when recovering a waste heat of the battery module and the electrical equipment in a heating mode of the vehicle,
   the first branch line is closed by an operation of the first valve, the second branch line is closed, and the coolant line is connected to the battery coolant line through the closed first and second branch lines,
   the connection between the battery coolant line and the first connection line is closed by an operation of the third valve, the battery coolant line and the second connection line respectively form an independent closed circuit by an operation of the fourth valve, in a state that the third branch line is opened by an operation of the fifth valve, the coolant line for connecting the electrical equipment with the radiator is closed, the second portion of the coolant is circulated along the second connection line by an operation of the third water pump in the heating device, and the refrigerant circulates, the expansion valve and the evaporator stop operation, and the sub-expansion valve operates to expand the refrigerant having passed through the sub-condenser and supplies the expanded refrigerant to the main heat exchanger in the CE module.

16. The heat pump system of the vehicle of claim 15, wherein, a waste heat generated from the electrical equipment and the battery module increases a temperature of the coolant circulating through the coolant line and the battery coolant line, the coolant of which a temperature is increased, is recovered while increasing a temperature of the refrigerant from the main heat exchanger, and the coolant that circulates along the second connection line is more heated through heat-exchange with the refrigerant supplied from the compressor in the sub-condenser and then supplied to the heater in the heating device.

17. The heat pump system of the vehicle of claim 8, wherein when increasing a temperature of the battery module in a heating mode of the vehicle, the first branch line is opened by operation of the first valve, the second branch line is opened, and the connection between the coolant line and the battery coolant line is closed by the opened first and second branch lines, the connection between the battery coolant line connected to the battery module and the first connection line is closed by an operation of the third valve, the battery coolant line is connected to the second connection line by an operation of the fourth valve, in a state that the third branch line is opened by an operation of the fifth valve, the coolant line for connecting the electrical equipment with the radiator is closed, and the refrigerant circulates, the expansion valve and the evaporator stop operation, and the sub-expansion valve operates to expand the refrigerant having passed through the sub-condenser and supplies the expanded refrigerant to the main heat exchanger in the CE module.

18. The heat pump system of the vehicle of claim 8, wherein, when cooling the battery module in a heating mode of the vehicle, the first branch line is opened by an operation of the first valve, the second branch line is opened, and the connection between the coolant line and the battery coolant line is closed by the opened first and second branch lines, the battery coolant line connected to the battery module is connected to the first connection line by an operation of the third valve, the battery coolant line and the second connection line respectively form an independent closed circuit by an operation of the fourth valve, the third branch line is closed by an operation of the fifth valve, and the refrigerant is circulated, the main heat exchanger and the sub-condenser condense the refrigerant, and the sub-expansion valve stop operation in the CE module.

19. The heat pump system of the vehicle of claim 8, wherein, in a dehumidification mode of the vehicle, the first branch line is closed by an operation of the first valve, the second branch line is closed, and the coolant line is connected to the battery coolant line through the closed first and second branch lines, the battery coolant line and the first connection line respectively form an independent closed circuit by an operation of the third valve, the battery coolant line and the second connection line respectively form an independent closed circuit by an operation of the fourth valve, the third branch line is closed by an operation of the fifth valve, the coolant circulates through first and second connection lines by operations of the second and third water pumps in the air conditioner and the heating device, respectively, and the refrigerant is circulated in the CE module.

20. The heat pump system of the vehicle of claim 19, wherein, when an external temperature is lower than a predetermined value in a dehumidification mode, the closed third branch line is open by an operation of the fifth valve, and the coolant line for connecting the electric product to the radiator is closed.

* * * * *